US008884146B2

(12) United States Patent
Paterson et al.

(10) Patent No.: US 8,884,146 B2
(45) Date of Patent: Nov. 11, 2014

(54) INTERNET SYSTEM FOR MONITORING PROGRESS OF A MUSIC STUDENT

(75) Inventors: Jennifer M. Paterson, Carlsbad, CA (US); Richard J. Blue, Carlsbad, CA (US)

(73) Assignee: Life Empowerment, Inc., Carlsbad, CA (US)

( * ) Notice: Subject to any disclaimer, the term of this patent is extended or adjusted under 35 U.S.C. 154(b) by 0 days.

(21) Appl. No.: 13/253,966

(22) Filed: Oct. 6, 2011

(65) Prior Publication Data

US 2012/0204703 A1 Aug. 16, 2012

Related U.S. Application Data

(63) Continuation-in-part of application No. 12/790,986, filed on Jun. 1, 2010.

(51) Int. Cl.
*G09B 15/02* (2006.01)

(52) U.S. Cl.
USPC ........................................................ 84/470 R

(58) Field of Classification Search
USPC ........................................................ 84/470 R
See application file for complete search history.

(56) References Cited

U.S. PATENT DOCUMENTS

| | | | | |
|---|---|---|---|---|
| 5,310,349 A * | 5/1994 | Daniels et al. | | 434/350 |
| 5,734,831 A * | 3/1998 | Sanders | | 709/223 |
| 6,201,771 B1 * | 3/2001 | Otsuka et al. | | 369/30.32 |
| 6,653,545 B2 * | 11/2003 | Redmann et al. | | 84/615 |
| 6,751,439 B2 * | 6/2004 | Tice et al. | | 434/350 |
| 7,157,638 B1 * | 1/2007 | Sitrick | | 84/477 R |
| 7,714,222 B2 * | 5/2010 | Taub et al. | | 84/600 |
| 8,138,409 B2 * | 3/2012 | Brennan | | 84/616 |
| 8,487,173 B2 * | 7/2013 | Emmerson | | 84/601 |
| 2001/0036620 A1 * | 11/2001 | Peer et al. | | 434/307 R |
| 2002/0004191 A1 * | 1/2002 | Tice et al. | | 434/350 |
| 2002/0138439 A1 * | 9/2002 | Matsushima et al. | | 705/52 |
| 2002/0161719 A1 * | 10/2002 | Manning et al. | | 705/64 |
| 2004/0024688 A1 * | 2/2004 | Bi et al. | | 705/37 |
| 2004/0193605 A1 * | 9/2004 | Weisman et al. | | 707/9 |
| 2004/0243584 A1 * | 12/2004 | Wesley et al. | | 707/10 |
| 2006/0179009 A1 * | 8/2006 | Tagg | | 705/80 |
| 2008/0190271 A1 * | 8/2008 | Taub et al. | | 84/645 |
| 2009/0070334 A1 * | 3/2009 | Callahan et al. | | 707/9 |
| 2009/0291426 A1 * | 11/2009 | Polivka | | 434/350 |
| 2011/0146476 A1 * | 6/2011 | Zimmerman | | 84/470 R |
| 2011/0282721 A1 * | 11/2011 | Dodson | | 705/14.14 |
| 2011/0290096 A1 * | 12/2011 | Paterson et al. | | 84/470 R |
| 2012/0117191 A1 * | 5/2012 | Miyoshi et al. | | 709/217 |
| 2012/0204703 A1 * | 8/2012 | Paterson et al. | | 84/470 R |

\* cited by examiner

*Primary Examiner* — Robert W Horn
(74) *Attorney, Agent, or Firm* — John R. Ross; John R. Ross, III

(57) ABSTRACT

A method of utilizing the Internet to permit music teachers to measure and document the progress of their music students without infringing the copyright of the owners of the music the students are learning. In order to avoid copyright infringement the method assures that all performances of the copyrighted works be made in private and not displayed publicly. In a preferred embodiment the method includes the creation of a number of secure private Internet systems, one for each student, with each system limited to a studio administrator, the student, his teacher, and a limited number (preferably less than 25) of designated third parties such as family members and friends of the student. In other preferred embodiment student performances are made available to the general public through the Internet for a fee which is shared with the owner, if any, of the copyright.

9 Claims, 32 Drawing Sheets

My Music Journal

Home Page

| Home | About | Instructions | Contact | Terms | Privacy |

Register ← 14

Log In to Your Account — 13

Testimonials

New Guidelines Announced

Scott Wins Regional Competition

Upcoming Concert

Welcome to My Music Journal

Welcome to My Music Journal. This site is the place where you can track ...

View Student Profile or Log in to Your Account — 12

Log in to your Musical Journal Account

Username

Password

☐ Remember Me

Log In

Register | Lost your password

FIG. 2

*Profile*

Howdy, Nate | Turbo | Log Out

Help

Personal Options

Visual Editor ☐ Disable the visual editor when writing

Admin Color Scheme

Keyboard Shortcuts ☐ Enable keyboard shortcuts for comment moderation | More Information

Name

Username [nate] Your username cannot be changed

First Name [Nate] — 42

Last Name [Harrison] — 43

Nickname (required) [nate] — 44

Display name publicly as [nate ▼] — 45

Contact Info:

E-mail (required) [nate@yahoo.com] — 46

Website [ ] — 47

| Go To Your Website | — 48

FIG. 4

Dashboard

Posts
Edit
Add New

Media
Library
Add New

Comments

Profile
Your Profile

My Music Journal (Personal Home Page)

| Home | About | Instructions | Contact | Terms | Privacy |

| Register |

Nate Harrison Intro — 51

Nate Harrison is fifteen years old and a student and Murphysville High School. Nate has been studying piano since ......

Pages by Nate

| Everything Audio |
| Everything Video | — 58
| Picture This |
| From the Teacher |

Profile Page — 53

What's New at CMS — 52

At California Music Studios we recently ......
(click here for more)

Acrhives

| March 2010 |
| February 2010 |
| January 2010 |

What's New With Nate

| Audio Accomplishments |
Natepianofeb3.wav

| Tests |

FIG. 5

My Music Journal

| Home | About | Instructions | Contact | Terms | Privacy |

| Register |

Nate Harrison: Audio Accomplishments

Natepianofeb3.mp3

0:00 ▲ ▲ ▼ — 112                                               4:21

2 Comments. Read it below or add one — 113

Nate: February 4, 2010 at 2:37 pm
   This is me playing Bach.

Aunt Kelly: February 7, 2010 at 4:26 pm
   Nate, that is so good!!! When and where did you play this??!!

Logged in as nate   | Logout |

Leave a Comment:

```
This is me playing the piano in February 3 at the
high school.  Not too shabby, eh? ☺
```
— 114

| Submit | — 115

FIG. 11

My Music Journal

[ Home ] [ About ] [ Instructions ] [ Contact ] [ Terms ] [ Privacy ]

[ Register ]

Nate Harrison: Audio Accomplishments

Natepianofeb3.mp3

0:00 [============================] 4:21

2 Comments. Read it below or add one

Nate:   February 4, 2010 at 2:37 pm
      This is me playing Bach.  ← 113

Aunt Kelly: February 7, 2010 at 4:26 pm
      Nate, that is so good!!! When and where did you play this??!!

Nate:   February 10, 2010 at 5:37 pm
      This is me playing the piano in February 3 at the high school. Not too shabby, eh? ☺

Logged in as nate  [ Logout ]

Leave a Comment:

[                                              ]

[ Submit ]

FIG. 12

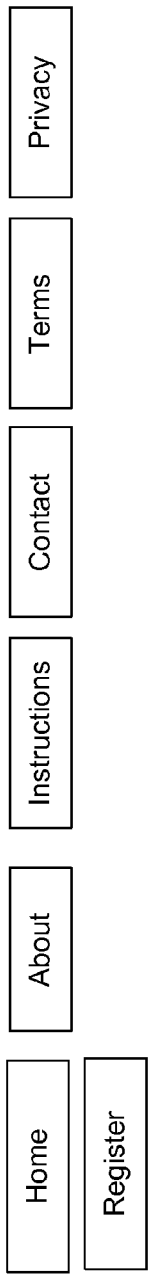
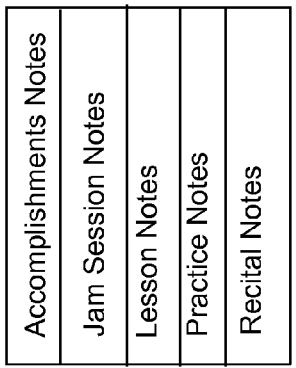
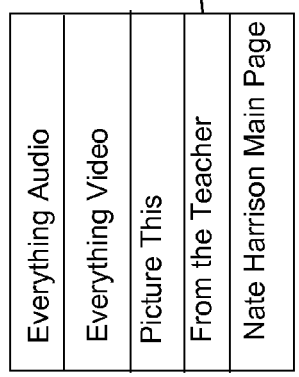
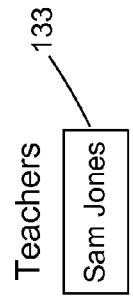
FIG. 13

Log in to your Musical Journal Account

Username

E-mail

First Name:

Last Name:

Associated Student Name:

Relationship to Student:

Password:

Confirm Password

Register — 16

FIG. 15

*Log in to your Musical Journal Account*

Your account will be reviewed by an administrator and you will be notified when it is activated.

FIG. 16

*My Music Journal*

| Home | Contact | About | Privacy | Terms |

Welcome

Log In

Username

Password

☐ Remember Me

Log In

News & Events

501

| Home | Contact | About | Privacy | Terms |

FIG. 22

View All Posts on the MMJ

| Home | Anna Shevelenko | | | Log Out |
| --- | --- | --- | --- | --- |
| | | | | Help |

Posts | Add New

All (4) | Published (3) | Pending (1)

1000

| Bulk Actions ▽ | Apply | | Show all dates ▽ | View all categories ▽ | | |
| --- | --- | --- | --- | --- | --- | --- |
| ☐ Title | 1001 | Author | Categories | | Tags | Date |
| ☐ Audrey's Sat. Lesson — Pending | 1002 | Anna S. ↘ Audrey | Lesson | | No Tags | 2011/07/11 Last Mod. |
| ☐ test3 | | | Accomplishment | | No Tags | 2011/07/11 Last Mod. |
| ☐ Example Post | | admin | Recital | | No Tags | 2011/03/15 Last Mod. |
| ☐ Teacher Post | | admin | Anna S | | No Tags | 2011/03/06 Last Mod. |

Dashboard

Posts ▽ | |
Posts
Add New
Media
Comments

Users
Tools

| Home | Contact | About | Privacy | Terms |
| --- | --- | --- | --- | --- |

FIG. 27

Edit/Add/Approve Posts - Make Available on Teacher or Main Journal Page

Dashboard

Posts ▽
Posts
Add New
Media
Comments

Users
Tools

Edit Post

Audrey's Saturday Lesson

Permalink: http://mymusicjournal.com/audreyly/2011/07/11/audreys-saturday-lesson
Edit  Get Shortlink ← 1104

Image Help    Video Help    Audio Help    Media

Outstanding Lesson Saturday!! Keep up practice on the scales and continue playing "Sweet Home Alabama".

Revisions
11 July 2011 @ 15:36 by Anna Shevelenko

Display Post

Portfolio ← 1101

1100

Comments

No comments yet. ← 1105

Publish                              Publish  1106
Move to Trash  ↗

Categories ← 1102    Most Used
All Categories
☑ Lesson
☐ Accomplishment
☐ Jam Session
☐ Practice
☐ Profile
☐ Profile Pic
☐ Recital
☐ Uncategorized Post Tags
Add New Tag    Add ← 1103

Choose from most used tags

Designate Post Type    Most Used
All Categories
☑ Audio
☐ Other
☐ Photo
☐ Video

FIG. 28

Comment Activities - Review and Approve/Decline Comments

| Home | Anna Shevelenko |

| Dashboard |

Comments

Posts
Media
Comments

Users
Tools

All | Pending (2) | Approved | Spam (0) | Trash (1)

| Bulk Actions ▽ | Apply | | Show all comment types ▽ | Filter |

| ☐ Author | | Comment | In response to |
| ☐ Anna Shevelenko | ← 1201 | 2011/06/21 at 4:45 pm<br>Great Job!!! | test3 |
| ☐ Anna Shevelenko | | 2011/06/21 at 4:41 pm<br>I like the effort here | test3 |
| ☐ Author | | Comment | In response to |

| Bulk Actions ▽ | Apply |

1200

| Log Out |
| Help |

| Home | Contact | About | Privacy | Terms |

FIG. 29

Main MMJ logged in as Student

| Home | Anna Shevelenko |

Audrey Ly's Music Journal test3 ← 1301

Posted on June 30, 2011 by Audrey

Playing some music!!

Comment | Edit

--- asdf

Posted on June 21, 2011 by Audrey

Leave a Comment | Edit

--- test2

Posted on June 21, 2011 by Audrey

Leave a Comment | Edit

Welcome
audreyly
> Log Out
> Add Post
> Edit Posts
> Admin Panel

Student Profile

News and Events
News and Events Two
News and Events Three

Main MMJ logged in as Teacher

| Home | Anna Shevelenko |

Audrey Ly's Music Journal test3

Posted on June 30, 2011 by Audrey

Playing some music!!

Comment | Edit asdf

Posted on June 21, 2011 by Audrey

Leave a Comment | Edit test2

Posted on June 21, 2011 by Audrey

Leave a Comment | Edit

Welcome
annashevelenko 1401
✓ Log Out
✓ Add Post

Student Profile

News and Events
News and Events Two
News and Events Three

Main MMJ logged in as Family/Friend

Home

Audrey Ly's Music Journal test3

Posted on June 30, 2011 by Audrey

Playing some music!!

Comment | Edit asdf

Posted on June 21, 2011 by Audrey

Leave a Comment | Edit test2

Posted on June 21, 2011 by Audrey

Leave a Comment | Edit

Welcome
testuser1     1501
✓ Log Out
✓ Add Post
✓ Admin Panel

Student Profile

News and Events
News and Events Two
News and Events Three

INTERNET SYSTEM FOR MONITORING PROGRESS OF A MUSIC STUDENT

CROSS REFERENCE TO RELATED APPLICATIONS

The present invention is a continuation-in-part of Ser. No. 12/790,986 filed Jun. 6, 2010.

FIELD OF THE INVENTION

The present invention relates to methods of monitoring the progress of music students and in particular of such methods which include techniques for documenting the progress.

BACKGROUND OF THE INVENTION

Music and Music Students

Music has been part of society since the beginnings of human society. There is evidence that music existed in Africa over 50,000 years ago, prior to the dispersal of humans to different continents. The "oldest known song" was written in cuneiform, dating to 4,000 years ago from Ur. It was deciphered by Prof. Anne Draffkorn Kilmer (University of Calif. at Berkeley), and was demonstrated to be composed in harmonies of thirds and also was written using a Pythagorean tuning of the diatonic scale.

As human society has progressed, music has continued to evolve. Cultures have known for millennia that musical instruction completes an education. It provides the practice necessary to take thoughts and ideas and convert them into actions. It takes empathetic, analytical and theoretical concepts and applies them in a practical, enriching and often uplifting experience. It builds life skills of decision making, organization, discipline, critical and logical thinking, follow through and self-expression. Musical forms throughout history have become increasing more complex and interesting as cultures have increased the scope of their conceptual understanding. Yet the method of teaching a student has remained similar throughout history. An instructor usually conducts lessons with a student, monitors his progress, verifies his development and offers encouragement and increasing challenges to further develop his skills. This method has worked tremendously well throughout history with many students, particularly those with the support and encouragement of family, friends and a social network. However, there are many students who also get lost along the way. The most common thought for millions of people alive today, who took music lessons as children, is "I wish I hadn't given up music lessons." For many there is an accompanying thought, "I wish my parents hadn't let me to stop." The average American who takes music lessons quits after 8 months. Perhaps many feel they do not get enough attention or positive reinforcement and decide to give up their instrument prematurely.

Modern technology is changing the world at an amazing pace. The personal computer is a fixture in most middle class homes in modern society. It is now possible for individuals to have instant access to inexpensive communication and information in ways never thought possible just two decades ago.

The Internet and Intranets

The Internet is a large network of interconnected computers that is sometimes referred to as a Wide Area Network (WAN). Initially developed by the United States Defense Department, it has expanded worldwide to a great variety of uses. A significant percentage of the population in the United States and in many other countries currently has access to the Internet and its use is growing rapidly.

The Internet is used to advertise products. Many companies have WEB sites and encourage potential customers to "visit" these pages. Creation of WEB sites is a well-developed Internet business with a great many people and organizations offering to create WEB sites. Some WEB sites are static, i.e. there is no interaction between the user and the WEB site. However, there are many well-known techniques that permit the WEB site to be made active. These techniques permit an Internet server to change WEB pages as often as desired and they permit users to communicate with a processor associated with the WEB site.

The technology also exists to establish a Local Area Network (LAN). A LAN is a network of interconnected workstations sharing the resources of a single processor or server within a relatively small geographic area. Typically, this might be within the area of a small office building. A suite of application programs can be kept on the LAN server. Users who frequently need an application can download it once and then run it from their local hard disk.

An Intranet is a network connecting an affiliated set of users (usually limited to a specific community of interest) using standard Internet protocols, esp. TCP/IP and HTTP. Intranets, also known as internal Webs, are only logically "internal" to an organization. Physically they can span the globe, as long as access is limited to the defined community of interest. To draw a comparison, the World Wide Web comprises all HTTP nodes on the public Internet. An internal web may comprise all HTTP nodes on a private network, such as an organization's LAN or WAN. If the organization is a corporation, the internal web is also a corporate web.

The Copyright Law

Section 102

Section 102 of the United States Copyright Law (17 USC) protects original works of authorship fixed in any tangible medium of expression. These works include: (2) musical works, including any accompanying words, (3) dramatic works, including accompanying music, (6) motion pictures and other audiovisual works and (7) sound recordings.

Section 106

Under Section 106 of the copyright law grants to the owner of the copyright the exclusive rights, subject to sections 107 through 122 of the law, to do and to authorize specified acts including the following: (1) to reproduce the copyrighted work in copies or phonorecords; (2) to prepare derivative works based upon the copyrighted work; (3) to distribute copies or phonorecords of the copyrighted work to the public by sale or other transfer of ownership, or by rental, lease or lending; (4) in the case of literary, musical, dramatic, and choreographic works, pantomimes, and motion pictures and other audiovisual works, to perform the copyrighted work publicly, (5) in the case of literary, musical, dramatic, and choreographic works, pantomimes, and pictorial, graphic, or sculptural, works, including individual images of a motion picture or other audiovisual work, to display the copyrighted work publicly; and (6) in the case of sound recordings, to perform the copyrighted work publicly by means of a digital audio transmission. (Emphasis added.)

Section 107

Section 107 of the law places a fair use limitation on the exclusive rights of the owner of the copyrighted work. This section provides that "fair use of a copyrighted work . . . is not an infringement of copyright". This section specifically provides"

> "Notwithstanding the provisions of Section 106 . . . , the fair use of a copyrighted work, including such use by reproduction in copies of phonorecords or by any other means specified by that section, for purposes such as criticism, comment, news reporting teaching (including multiple copies for classroom use), scholarship, or research, is not an infringement of copyright. In determining whether the use made of a work in any particular case is a fair use the factors to be considered shall include—
> (1) the purpose and character of the use, including whether such use is of a commercial nature of is for nonprofit educational purposes;
> (2) the nature of the copyrighted work;
> (3) the amount and substantiality of the portion used in relation to the copyrighted work as a whole; and
> (4) the effect of the use upon the potential market for or value of the copyrighted work.
> The fact that a work is unpublished shall not itself bar a finding of fair use if such finding is made upon consideration of all of the above factors." (Emphasis added.)

The current provisions of the Copyright Law relating to fair us were enacted in 1976 after much controversy in which members of Congress sought input from representatives of authors and owners of copyrighted works and representatives of people (especially representatives of the education community) who had previously made use of copyrighted works without licenses from the owners of the copyrights under a judicially created doctrine of "fair use". These representatives prepared guidelines which could be referred to for the purpose of determining whether or not a particular act constituted fair use. These guidelines did not become a part of the legislation but were included in the Congressional Record and can be and have been considered by judges in deciding fair use issues. Representative of the music publishing industry and the music teachers and music educators submitted agreed upon guidelines which listed some permissible uses which were intended to be minimal guidelines meaning that other instances of copying may be fair uses even though the copying does not fall within the guidelines. These guidelines were submitted under the title "GUIDELINES FOR EDUCATIONAL USES OF MUSIC". The guidelines listed five permissible uses and five prohibitions. These guidelines are reproduces as annotations after Section 107 of 37 United States Code Annotated. The fourth "Permissible Use" is:

> "4. A single copy of recordings of performances by students may be made for evaluation or rehearsal purposes and may be retained by the educational institution or individual teacher."

The DMCA

The Digital Millennium Copyright Act (hereinafter "DMCA") was enacted by the US Congress in 1998 to amend the Copyright Law and is codified at 17 USC Section 512. The DMCA includes provisions creating protection against money damages for Online Service Providers who inadvertently commit or enable copyright infringing activities. A copy of Section 512 is attached (Attachment 2). It includes very specific rules that a service provider must follow if the service provider is to be protected against liability for money damages. The basic requirement is that the service provider must not be aware that a copyright infringement is occurring and if he is made aware of an infringement, he must quickly remove the offending material.

What is needed is a way method of utilizing the Internet to permit music teachers to measure and document the progress of their music students and to make that progress available to the family and friends of the student without infringing the copyrights of the owners of the music the students are learning.

SUMMARY OF THE INVENTION

The present invention provides a method of utilizing the Internet to permit music teachers to measure and document the progress of their music students without infringing the copyright of the owners of the music the students are learning. In order to avoid copyright infringement the method assures that all performances of the copyrighted works be made in private and not displayed publicly. In a preferred embodiment the method includes the creation of a number of secure private Internet systems, one for each student, with each system limited to a studio administrator, the student, his teacher, and a limited number (preferably less than 25) of designated third parties such as family members and friends of the student.

Private Performances

In preferred embodiments a server computer is programmed with software that permits private secure communication between a music studio, teachers and their students. Software is provided that permits music teachers and their students to upload encrypted student performances (including performances of copyrighted musical works) to a server operated by the music studio. In preferred embodiments the uploaded performances are stored in a file referred to as the students' Journal, and identified to each particular student. The software is designed to permit the music studio to limit access to the students' performances to a limited number of persons who have agreed to prevent access to the performances by members of the general public. In preferred embodiments the software permits access to only ten computers as designated by the students or their teachers. The studio, through an administrator has control of the server and is obligated to take down any performance in accordance with the requirements of the DMCA that he is made aware of that violates any copyright. It is the purpose of the present invention to provide a method by which a music studio can utilize the Internet to permit music students to allow in private to their friends and family to view and listen to their performances of copyrighted musical works. The procedures of this invention are carefully prepared to assure that all performances by the student are private (not public) performance and to assure that any copying of the performed musical work is permitted as fair use of the copyright which is not an infringement of the copyright.

An administrator computer controlled by the studio also communicates with the server computer. The administrator computer is programmed to permit an administrator to coordinate communication in private among the teacher, the student and a limited number (such as ten) of selected third parties. This communication is through a secure private "virtual intranet" via computers under the control of the teacher, computers under the control of the music student (or his family) and computers under the control of a limited number (such as ten) of selected third parties. These third parties are typically family members and friends of the student or the student's family. Performances can be downloaded to the identified computers, but special software prevents the copying of the downloaded performances. These computers are programmed for transmitting and receiving music information related to the learning process of the music student. Preferably, the music information related to the learning process of the music student includes recorded video and/or audio performances by the student (including video and/or audio performances of copyrighted works), photos and praise, criticism, suggestions and comments by the teacher and the limited number of third parties.

The administrator is responsible for assuring that all activities carried out through the private Intranets is in full compliance with the United States Copyright Law. Specifically, sheet music of copyrighted works used by the teacher should be purchased from authorized publishing houses unless an exception is clearly authorized by the copyright law. The student and all third parties making use of the Intranet must be informed of their obligations under the copyright law. The administrator also has the obligation to comply with the requirements of the DMCA so as to avoid any liability for damages when informed of a copyright infringement in connection with one of the Intranets.

Public Performances of Copyrighted Works

Public performances of copyrighted works may be an infringement of the copyright unless the public performance is pursuant to a license from the owner of the copyright. In a second preferred embodiment of the present invention, a music studio and its music teachers utilize the Internet to permit their students to perform copyrighted works for the general public. In accordance with this embodiment the music studio will enter into agreements with owners of copyrighted works or their agents authorizing the music studio to make available to the general public performances by students of the copyrighted works. The studio will provide its teachers with lists of copyrighted works covered by the agreements. Performances of the copyrighted works may be uploaded to the server and made available to the public. The same server or a separate server will be programmed with software to permit members of the general public to pay a fee to the studio to download, listen to or view the performances of the students. A portion of fee may be automatically set aside to pay an agreed upon license royalty to the agent of the owner of the copyright. Another portion of the fee is set aside for the student performer and/or his teacher. The music studio may charge the teacher or the student an up-front fee with respect to each performance made available to the general public.

In an alternative embodiment the music studio may rely on its teachers or their students to negotiate licenses with copyright owners or their agents that permit Internet performances of the copyrighted works. In this case the fees paid by the general public may be divided between the studio and the teacher and/or student.

Works that are in the public domain are not covered by copyright and may be made available to the general public, in which case any fees collected may be divided between the studio and the student and/or his teacher.

BRIEF DESCRIPTION OF THE DRAWINGS

FIG. 1 shows a preferred home page.
FIGS. 2-3 show a preferred log on page.
FIG. 4 shows a preferred personal profile page.
FIG. 5 shows a preferred personal home page.
FIGS. 11-12 show another preferred audio accomplishments page.
FIG. 13 shows a preferred teacher comments page.
FIGS. 15-16 show a preferred registration page.
FIGS. 22-32 show another preferred embodiment of the present invention.

DETAILED DESCRIPTION OF THE PREFERRED EMBODIMENTS

First Preferred Embodiment

Figure 3:
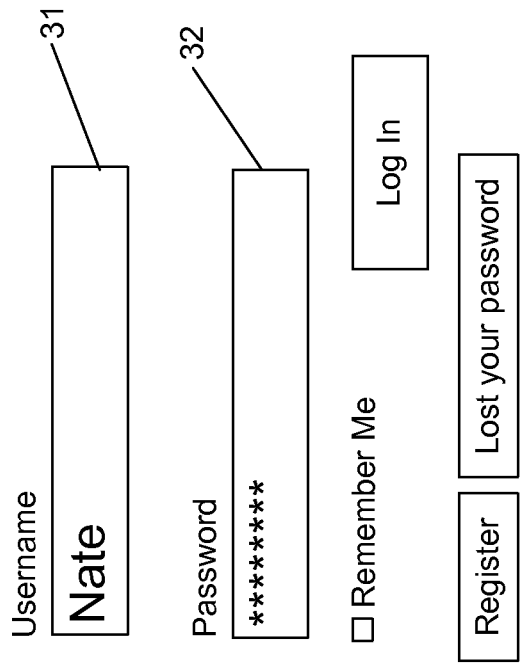

Internet System for Private Monitoring of Music Students

A first preferred embodiment of the present invention provides a method of utilizing the Internet to permit music teachers utilizing copyrighted works to document the progress of their music students and make that documentation available to family and friends of the student without infringing the copyright of the owners of the music that the students are learning. In order to avoid copyright infringement the method assures that all performances of the copyrighted works be made in private and not displayed publicly. In a preferred embodiment the method includes the creation of a number of secure private Internet systems, one for each student, with each Internet system limited to a studio administrator, the student, his teacher, and a limited number (preferably less than 10) of designated third parties such as family members and friends of the student.

Private Performances

In preferred embodiments a server computer is programmed with software that permits private secure communication between a music studio, teachers and their students. Software is provided that permits music teachers and their students to upload encrypted student performances (including performances of copyrighted musical works) to a server operated by the music studio. In preferred embodiments the uploaded performances are stored in a file referred to as the students' Journal, and identified to each particular student. The software is designed to permit the teacher and the student to limit access to the students to a limited number of persons who have agreed to protect access to the file by members of the general public. In preferred embodiments the software permits access to only ten computers as designated by the students or their teachers. The studio has control of the server and is obligated to take down any performance in accordance with the requirements of the DMCA that he is made aware of that violates any copyright.

An administrator computer controlled by the studio is also connected to the server computer. The administrator computer is programmed to permit an administrator to coordinate communication in private among the teacher, the student and a limited number (such as twenty-five) of selected third parties. This communication is through a secure private "virtual intranet" via computers under the control of the teacher, computers under the control of the music student (or his family) and computers under the control of a limited number (such as ten) of selected third parties. These third parties are typically family members and friends of the student or the student's family. Performances can be downloaded to the identified computers, but special software prevents the copying of the downloaded performances. These computers are programmed for transmitting and receiving music information related to the learning process of the music student. Preferably, the music information related to the learning process of the music student includes recorded video and/or audio performances by the student (including video and/or audio performances of copyrighted works), photos and praise, criticism, suggestions and comments by the teacher and the limited number of third parties.

The administrator is responsible for assuring that all activities carried out through the private Intranets is in full compliance with the United States Copyright Law. Specifically, sheet music of copyrighted works used by the teacher should be purchased from authorized publishing houses unless an exception is clearly authorized by the copyright law. The student and all third parties making use of the Intranet must be informed of their obligations under the copyright law. The administrator also has the obligation to comply with the requirements of the DMCA so as to avoid any liability for damages when informed of a copyright infringement in connection with one of the Intranets. In preferred embodiment the administrator is registered with the United States Copyright Office as the Interim Designated Agent to receive notification of any claimed infringement of any copyrights. In the event of any claim the administrator must respond expeditiously to remove, or disable access to, the material that is claimed to be infringing or to be the subject of infringing activity.

Figure 18:
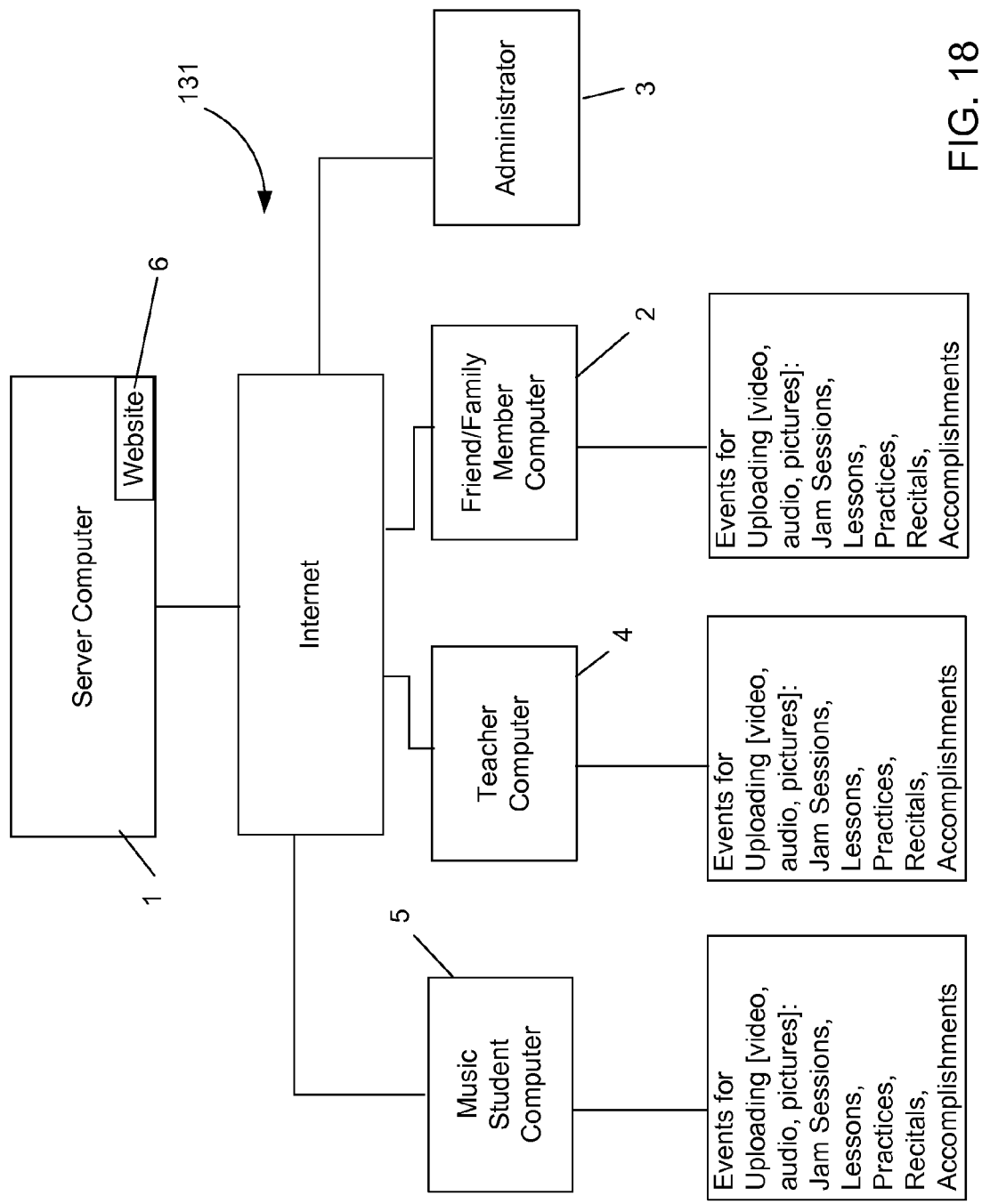
FIG. 18 shows a preferred embodiment of the present invention.

FIG. 18 shows a preferred embodiment of the present invention. The system shown in FIG. 18 allows for the storing, organizing, sharing and tracking of the music learning process of the music student. As the system is utilized, the student is given positive reinforcement by those closest to him and gains incentive to conquer innate challenges inherent in mastering any musical form. Server computer 1 is programmed to facilitate safe and secure communication between the music student and those who have been approved to monitor his progress. It is one principle of the present invention that by communication with approved network members, the student will receive positive reinforcement and be continuously motivated to practice, study, perform, and learn music.

Website 6 is a student monitoring web site of a music studio practicing a preferred embodiment of the present invention. Website 6 is programmed onto server computer 1. Music student computer 5, teacher computer 4, administrator computer 3 and friend/family member computer 2 are each connected to server computer 6 via the Internet. In a preferred embodiment of the present invention, a music student, a music teacher and friends and family of the music student each are registered members of website 6. The music student is able to upload musical events (for example, musical performances, music practice sessions, and music jam sessions) onto website 6. The music teacher is able to review the student uploads and make comments and suggestions. The music teacher is also able to upload music related events onto website 6. Friends and family members likewise are able to review the student uploads and make comments and upload music related events onto website 6. In this fashion, the music student receives constant positive reinforcement from his music teacher and those who are closest to him. A record is kept of his musical growth so it is very easy to see progression. These features are motivating and rewarding to the student and the student is more likely to continue to want to learn his instrument.

Examples of Usage of the Website

In a preferred embodiment as shown in FIG. 18, website 6 is programmed onto server computer 1. Music student computer 5 is connected to server computer 1 via the Internet. It is understood that students who are adults or older teenagers will likely operate student computer 5 themselves. However, younger children who are music students will preferably have a parent or legal guardian controlling student computer 5 on behalf of the music student. Therefore, for the purpose of this description it should be understood that a student refers to either the student himself or his guardian.

In FIG. 1 a new student has logged onto website 6. Before he can fully utilize the website, the student needs to register. In the course of that registration, the student (or his parent or guardian) is required to agree to a set of terms and conditions prepared by the music studio. These terms and conditions clearly explain the requirements of the student and his teacher for compliance with the United States Copyright Act. The student clicks on register button 14. This takes the student to the registration page (FIG. 15). Here the student fills in the appropriate identifying information in the designated boxes. After he has filled in his identifying information the student clicks on register button 16. An email is then sent to the administrator at administrator computer 3 notifying the administrator of the registration. Also, the student view on his monitor the webpage shown in FIG. 17 informing him that his account is being reviewed by an administrator and that he will be notified when it is active.

In another preferred embodiment, the student is pre-registered by the administrator prior to logging onto the website. In this preferred embodiment it is not necessary for the student to register as described above. However, provisions should be made for the student or a responsible person to confirm that the terms and conditions of the studio will be complied with.

After approval by the administrator the student is able to log on to website 6 (FIG. 18). In FIG. 1, the student has entered into student computer 5 the website address for website 6. The student then clicks on either button 12 or button 13 to log on to his account, after which the student views the image on his monitor shown in FIG. 2.

In FIG. 3, the student has entered his username and password into boxes 31 and 32 as shown. He then clicks on button 33 to complete the log on process.

In FIG. 4, the student has been directed onto his profile page. From this page the student can edit and add profile information by inserting text into boxes 42-47. In one preferred embodiment, once the username has been assigned, it cannot be edited at the profile page. From the profile page the student clicks on button 48 to proceed to his personal homepage (FIG. 5). The student can also edit or add posts to his home page. For example, the student can click on Add New button 49 to add a new post to his website.

In FIG. 5, the student is at his personal home page. His personal introduction 51 is on this page as well as update information 52 dealing covering recent events at the music school. To modify the home page, the student clicks on profile page button 53 to go back to the profile page.

Figure 6:
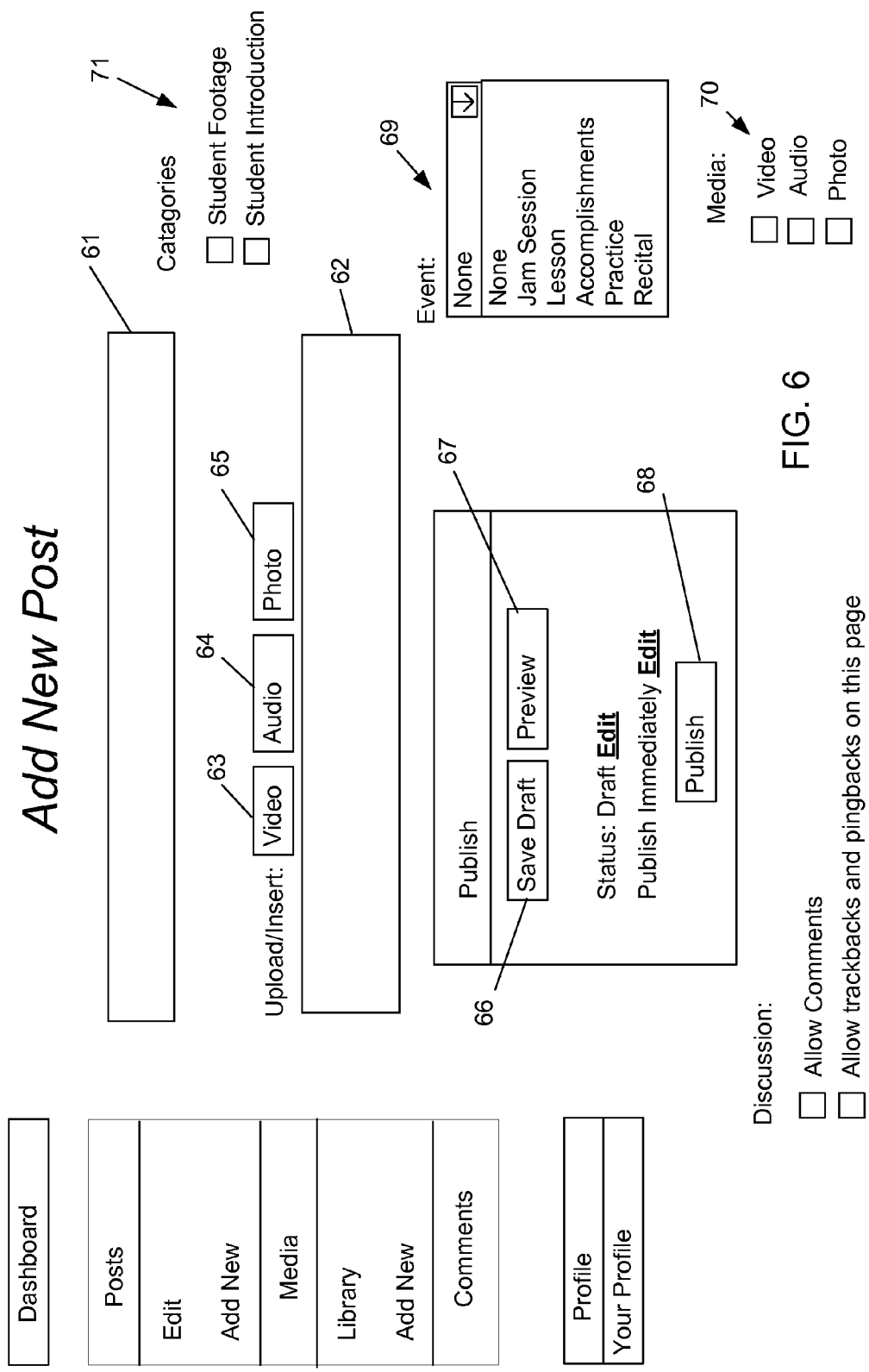
FIG. 6 shows a preferred page for adding a post.

In FIG. 6, the student is on the correct web page for adding a new post. The student fills in the title of the post by filling in box 61. The student can then fill in explanatory information regarding the post by filling in box 62. Finally, the student clicks on button 63, button 64 or button 65 to start the upload process for uploading the post to website 6. The student can then either save the post for later upload by clicking on button 66 or preview the post by clicking on button 67. The student must classify the nature of his post by selecting one of the categories from drop down menu 69 and the media type by making a selection from media selection area 70. For example, a student might want to upload a video of him playing piano and classify it as an Accomplishment Video. Once the student is satisfied with the quality of his post he can publish it onto website 6 by clicking on button 68. These classifications determine placement of the post on the student pages.

Figure 7:
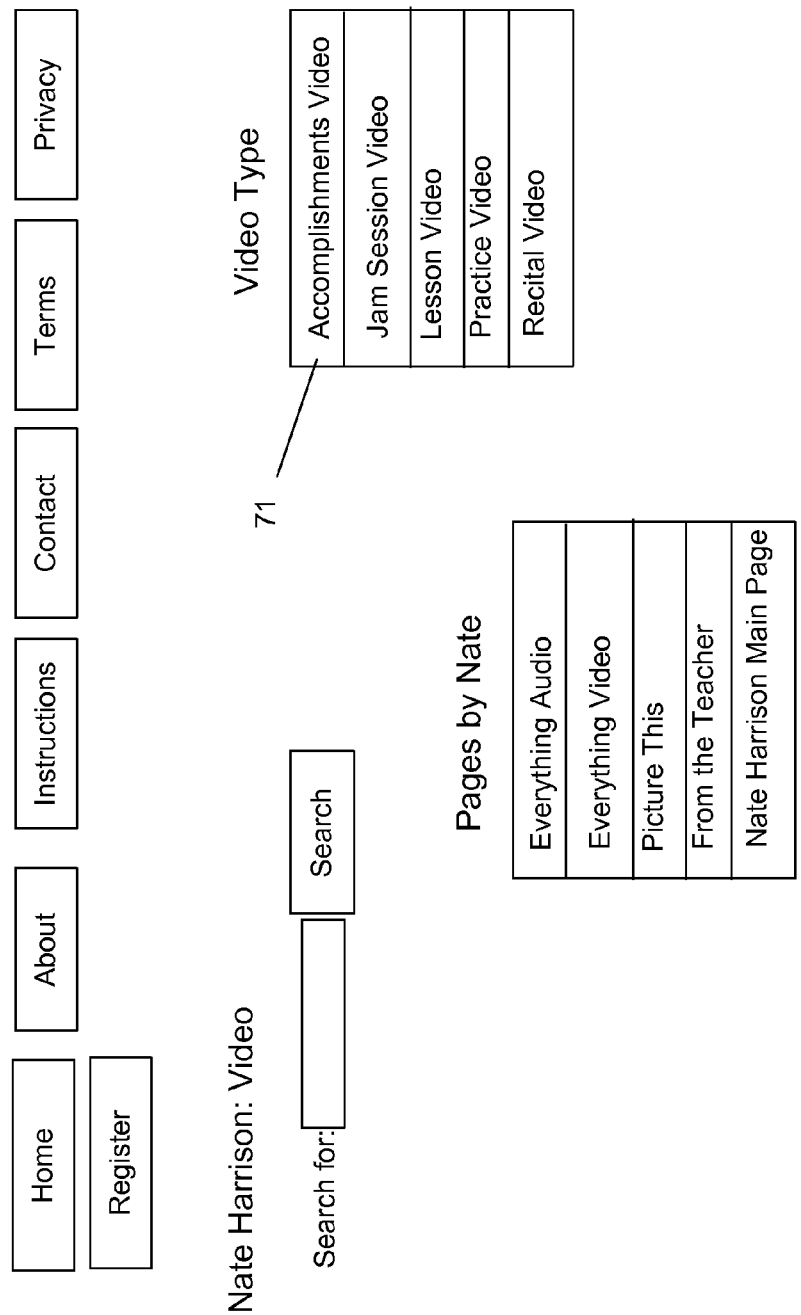
FIG. 7 shows a preferred video page.
Figure 8:
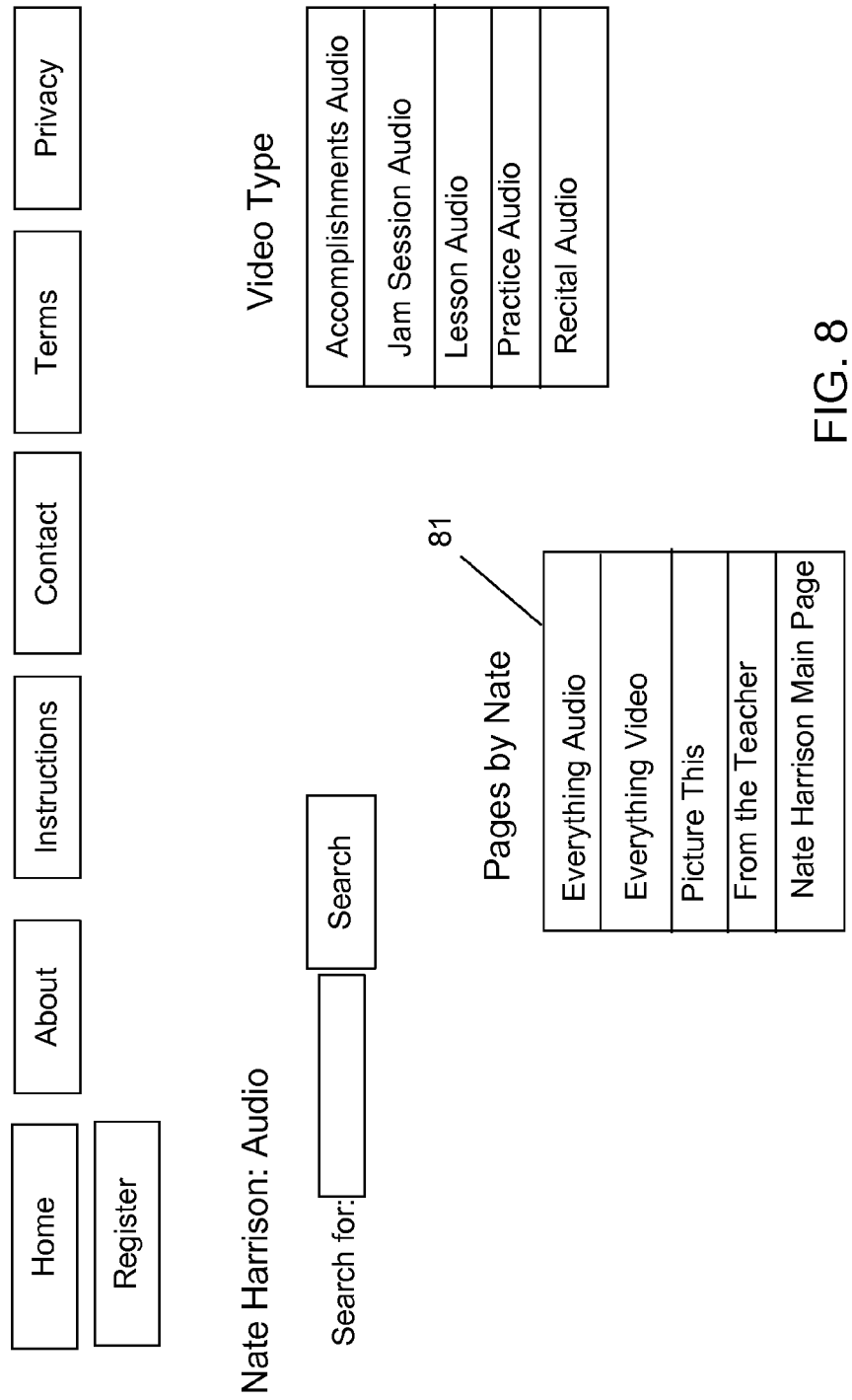
FIG. 8 shows a preferred audio page.
Figure 9:
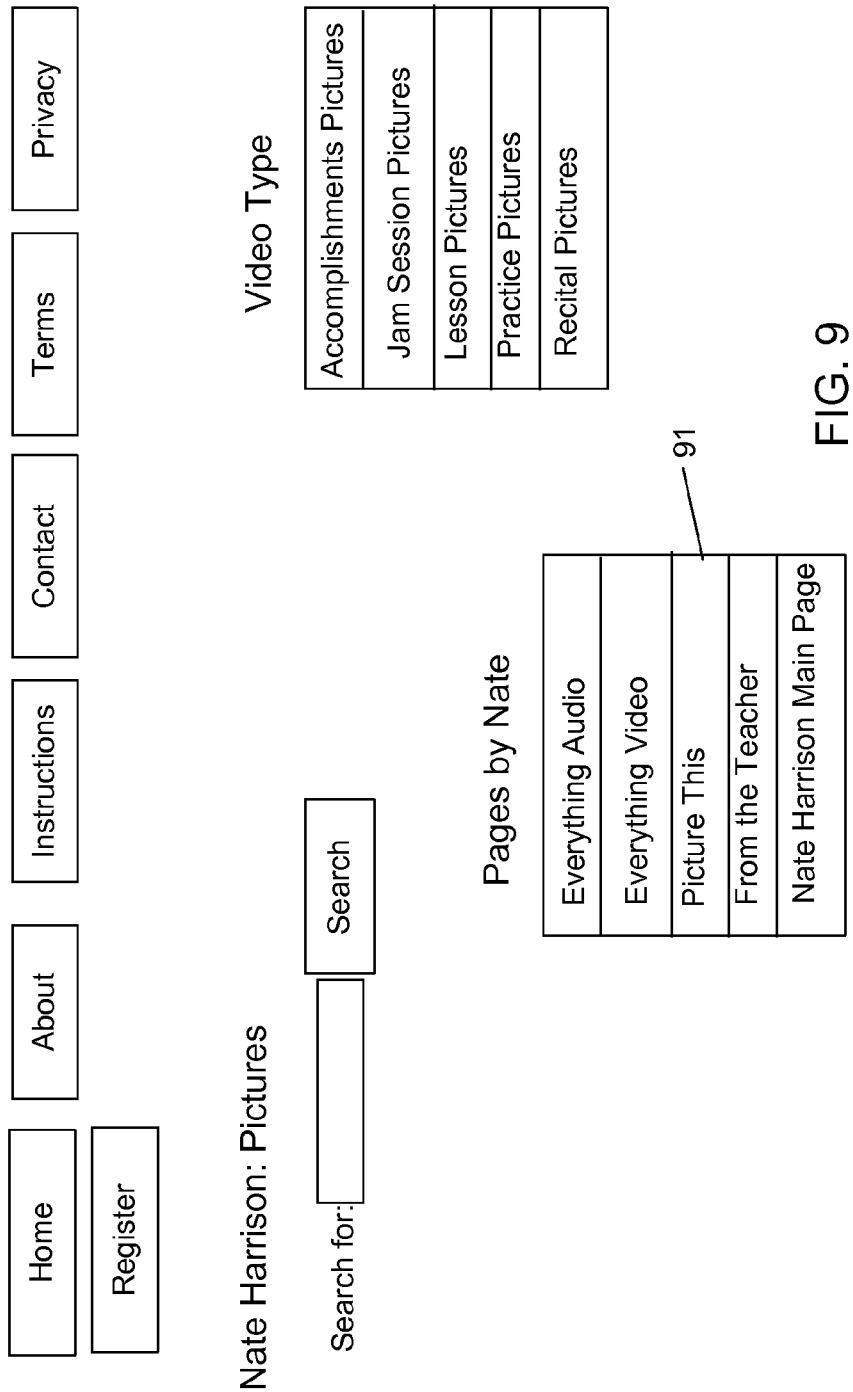
FIG. 9 shows a preferred pictures page.

In FIG. 7, the student has clicked on Everything Video button 58 from his homepage (FIG. 5). From here, the student can click on specific video types. Similarly, in FIG. 8, the student has clicked on Everything Audio button 81. From here, the student will then be able to access specific audio recordings. In FIG. 9, the student has clicked on "Picture This" button 91. From here, the student will then be able to access specific photographs related to his music. In a preferred embodiment one-month worth of posts are displayed. At the conclusion of the month, the posts are automatically transferred to the "Archives".

Figure 10:
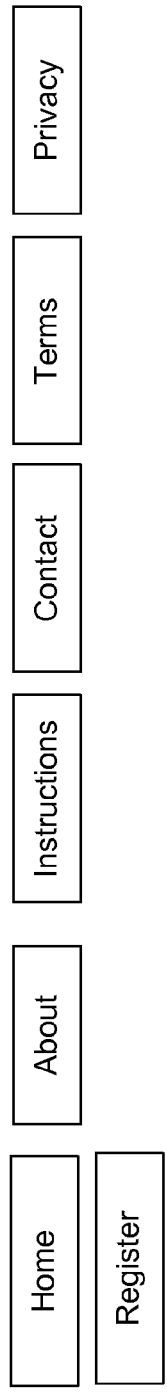
FIG. 10 shows a preferred audio accomplishments page.

In FIG. 10, the student has clicked on Accomplishments Video button 71 (FIG. 7). The Audio Accomplishments webpage shows a listing of uploaded audio recordings of the student playing piano. To listen to a particular recording, the student clicks on the recording of interest.

In FIG. 11, the student has clicked on "natepianofeb3.mp3" (FIG. 10). The student can now listen to the upload by clicking on arrow 112. The student can read comments posted by himself and others by reading them at comment area 113. The student can make additional comments by entering the comment into box 114 and clicking submit button 115.

In FIG. 12, the student has added an additional comment that can be read at comment area 113.

In FIG. 13, the student has clicked on From the Teacher button 141 to read feedback from his music teacher. The music teacher's name is Sam Jones. To view the music teacher's web page the student can click on button 133. In FIG. 13, the teacher has observed the student playing the piano and has made comments giving the student instructions to practice the pentatonic blues scale and also words of encouragement to "keep up the excellent work!" In a preferred embodiment the student may have several teachers all of which would be listed on the students From the Teacher page. Preferably, only posts for the "logged in" student will be shown on the From the Teacher page. For example, if Sam Jones has ten students, only the posts for the "logged in" student will be available.

Figure 14:
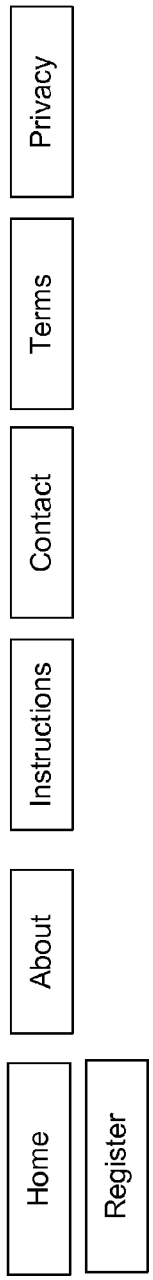
FIG. 14 shows a preferred teacher home page.

In FIG. 14, the student has navigated to the music teacher's home page. Here the student can read information about his music teacher and review the teacher's notes and archived information by clicking on archive buttons 148.

Registration of the Friend and Family Member

A friend or family member can register at website 6 (FIG. 18). In FIG. 15, a family member has arrived at a registration page after clicking on register button 14 (FIG. 1). The family member fills in the appropriate information and clicks on register button 16. The family member then views on his monitor the webpage shown in FIG. 16 informing him that his account is being reviewed by an administrator and that he will be notified when it is active. An email is then sent to the administrator at administrator computer 3 notifying the administrator of the registration attempt. Additionally, an email is sent to student computer 5 notifying the student of the registration attempt. Once the student verifies that he is willing to allow the family member access to his account information, the administrator sends notification to the family member that his registration has been accepted.

Administrator Approval of Log on Attempt

Figure 17:
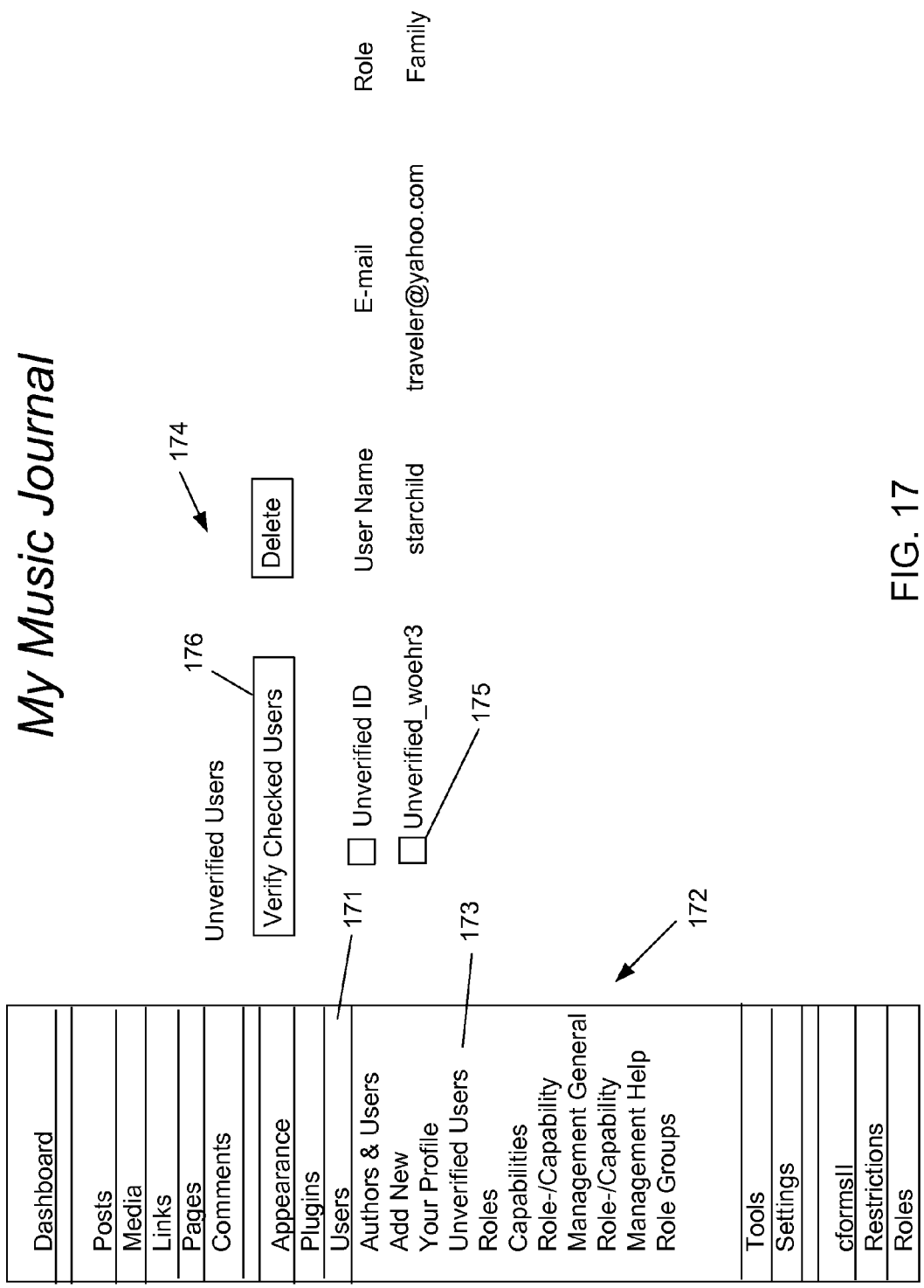
FIG. 17 shows a preferred administrator page.

In FIG. 17, the administrator has clicked on Users button 171 to bring up drop down menu 172. The administrator then has clicked on Unverified users 173 to bring up display 174. After receiving the request from username "starchild" and after receiving approval from the music student the administrator verifies the user by first clicking in box and then clicking Verify Checked Users button 176.

Local Area Network

Figure 19:
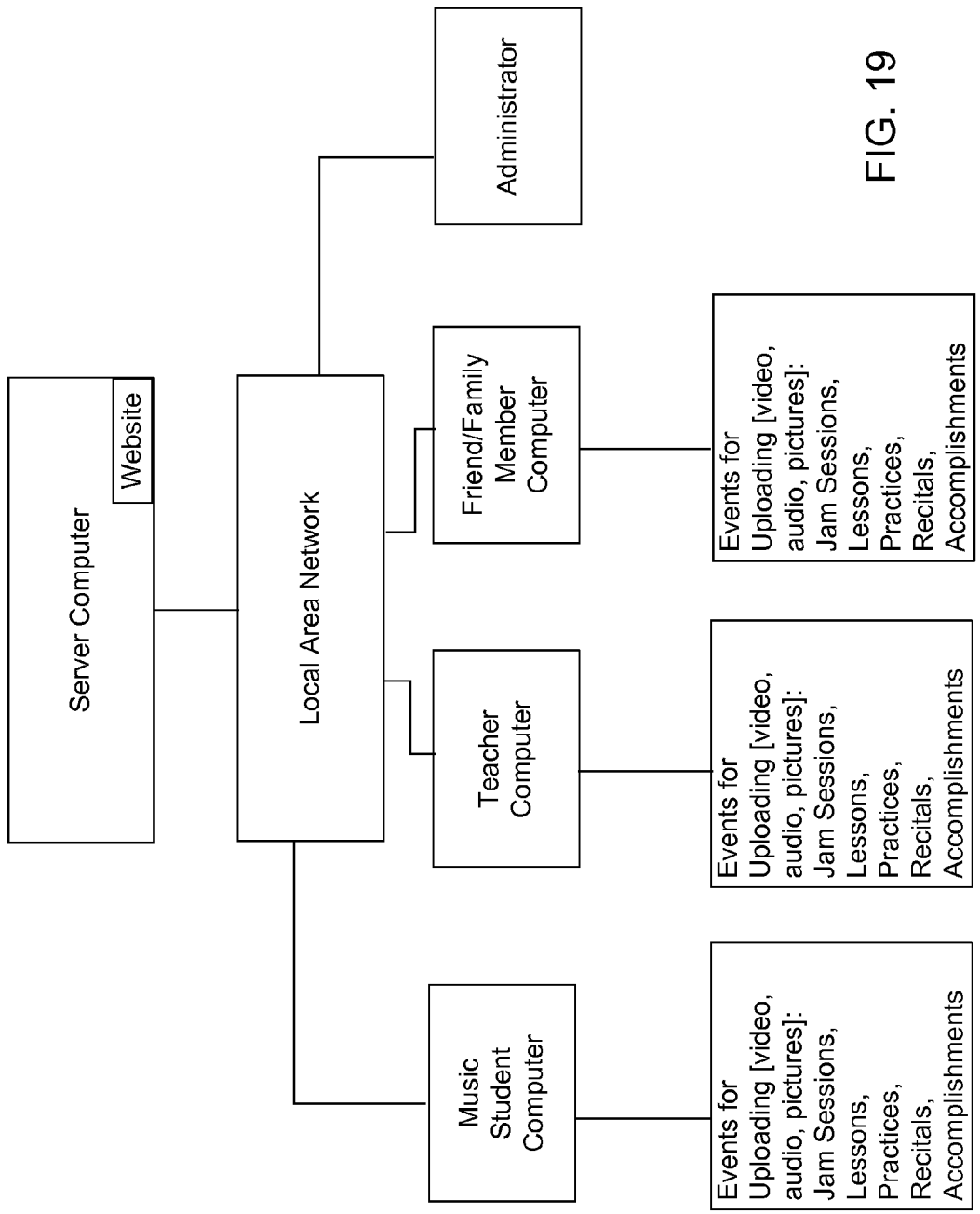
FIG. 19 shows another preferred embodiment of the present invention.

Although the above preferred embodiment discussed the utilization of the Internet for providing the connectivity between the music student, the teacher, the friend, the family member and the administrator, it is also possible to set up a Local Area Network to establish connectivity. For example, a Local Area Network can be set up at a university or other music school. Server computer 1 would be at the university and the Local Area Network would provide the connection (FIG. 19).

Student Motivator

Website 6 functions to motivate the music student to learn and practice music. It is fun and rewarding for the music student to share performances to be observed by friends and family members. Additionally, a record is preserved at website 6 of the student's progress. The student, his teacher and friends and family members will see from month to month and from year to year how the student has improved. This will serve to encourage the student to practice even more.

Teaching Tool

Website 6 is an incredible teaching tool for use by a music teacher. The music teacher can communicate and monitor all his students who are registered through website 6. The teacher can observe their latest practice session and make constructive comments. The teacher can additionally record his own musical lesson or performance and upload it for the benefit of the student. The student will be able to watch and listen to the musical performance and lesson and make adjustments accordingly.

Family and Friend Connection

Family members and friends are able to communicate with the musical student and comment on his progress. In this fashion, website 6 functions to strengthen family ties and friendships.

Third Party Computer

The above preferred embodiments disclosed the utilization of family/friend computer 2. Family/friend computer 2 is just one example of a third party computer. Third party computer 8 (FIG. 20) is a computer that allows someone other than the student and his teacher to follow the progress of the student as he learns his instrument. Besides a family member or a friend, another example of someone who would operate a third party computer is any individual or social network member approved by the student and also by the administrator. There are many types of social network members who may be interested in operating third party computer 8. For example, another student interested in learning a musical instrument similar to that of the students might seek approval and be permitted to operate the third party computer. He will then be able to track the earlier student and then decide if this is something he might also like to learn and study. Or, an individual interested in learning more about a particular teacher might seek approval and be permitted to operate a third party computer. The individual could then observe the teacher in action and decide if this would be a good instructor to hire.

A Source of Advertisement

Website 6 is a tremendous source of advertisement to the operators of website 6 as well as the individual teachers who interface with the students by utilization of website 6. Friends and family members who observe the student may become interested in music. Soon, they too may want to study music. Accordingly, they may communicate their desires to the operators of website 6 and/or a specific teacher who is associated with the website. However, if Website 6 is to be made available to the general public, special care should be taken to avoid copyright infringement. This will require close scrutiny by the administrator and may call for periodic reviews of the web site by a copyright expert.

Administering Website Six

In a preferred embodiment, as explained above website 6 is controlled by an administrator via administrator computer 3 (FIG. 18). In a preferred embodiment, administrator 6 is employed by a music school and is specially trained in copyright law. In this preferred embodiment, access to website 6 is generally by the administrator free of charge. However, the administrator may also charge a fee for premium access. Premium access may allow users to have enhanced upload capability to upload and store larger sized files than would be allowed to typical users who are accessing website 6 free of charge. Also in another preferred embodiment, the administrator may license website 6 to other administrators from different music schools. The other administrators from the other music schools can create their own websites with their own students, teachers, and third party members.

Website Functions With or Without the Participation of a Music Teacher

In the above preferred embodiments, it was described how the music teacher interacts with the student through website 6. It should be understood that a music student can access the website and receive benefits from the website without the participation of the music teacher. In this preferred embodiment, the student accesses website 6 via student computer 5. The student interacts with friends and family members through website 6 in a manner similar to that described above. The friends and family members access the website 6 via family/friend computer 2. This immersive interaction between the student and his friends and family members positively impacts the student and he is encouraged to study music longer so as to become proficient in his musical form.

Other Preferred Embodiments

Utilization by Multiple Music Schools

Option A: Multiple Schools Administered by a Centralized Website

Figure 20:
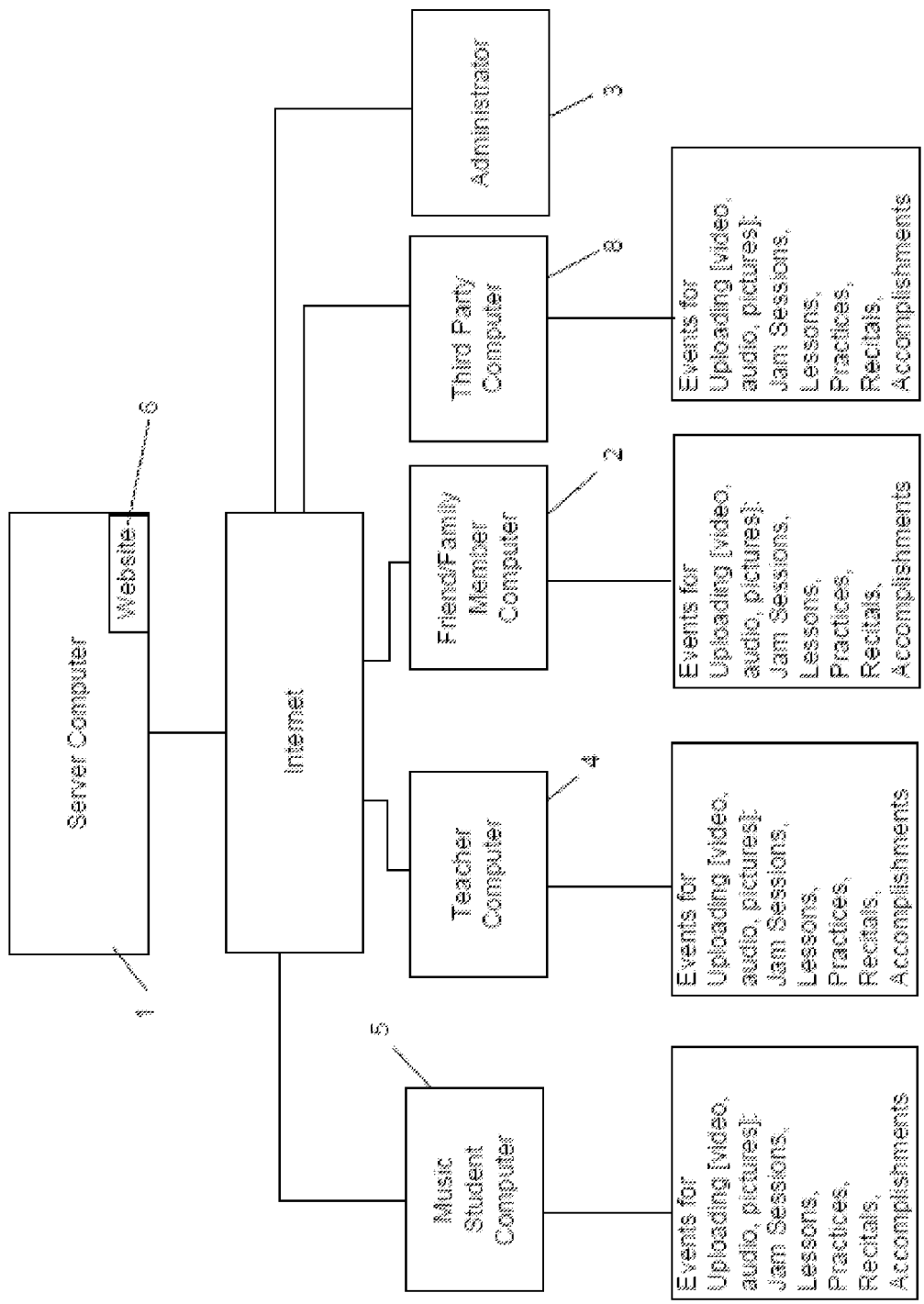
FIG. 20 shows another preferred embodiment of the present invention.
Figure 21:
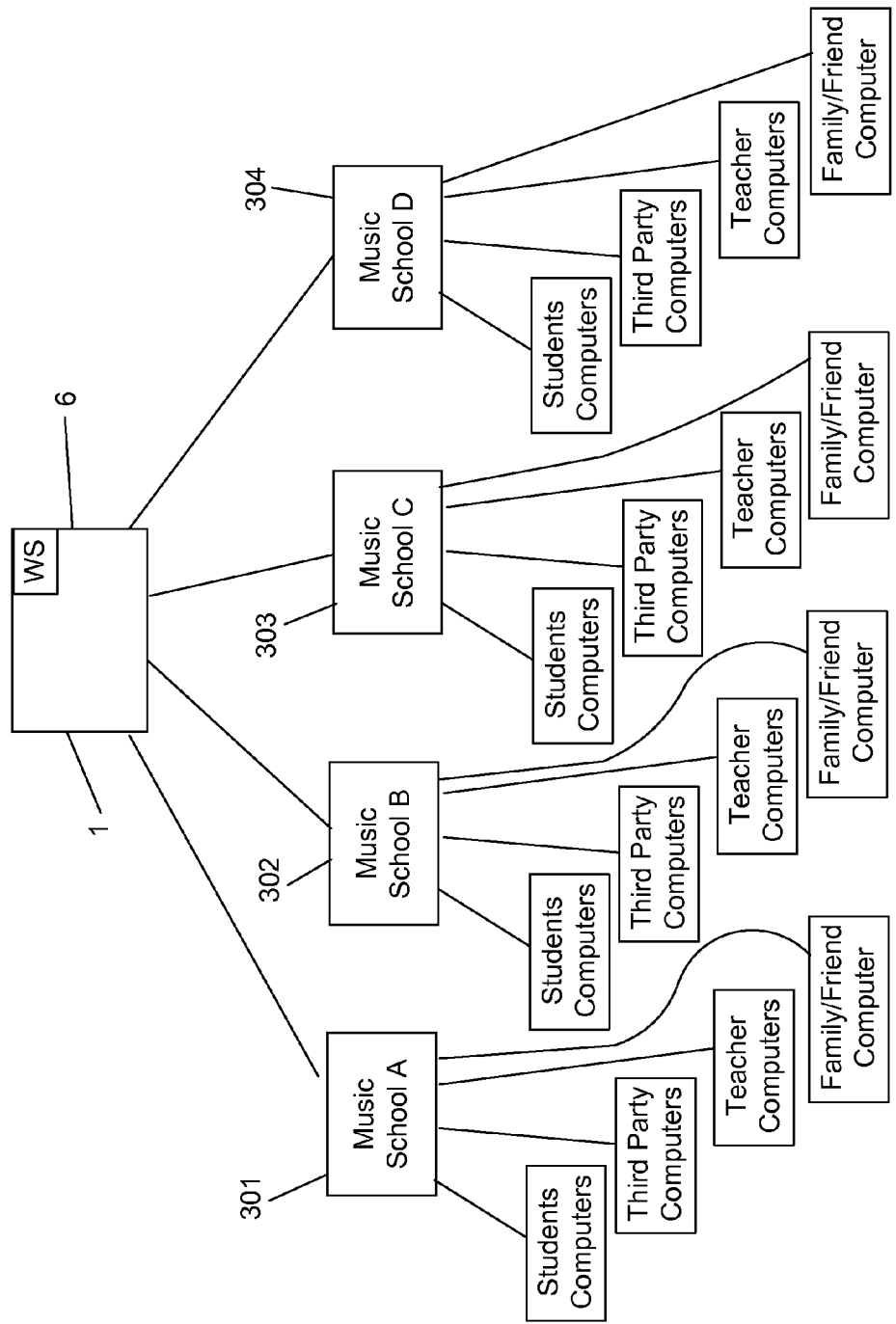
FIG. 21 shows another preferred embodiment of the present invention.

In another preferred embodiment, multiple music schools can utilize the website 6 (FIG. 20). In one preferred embodiment, the main administrator of centralized website 6 refers to website 6 as "My Music Journal". A software package is then sold to multiple music schools. For example, in the system shown in FIG. 20, each music school A-D interfaces with its own student population. To utilize website 6 a school will go to website 6 and click on a "Get the Journal Button". For example, if School A joined website 6 a preferred "School A" homepage would read as:

http://www.MyMusicJournal.com/School_A

The initial set up of the system will be handled by the administrator of centralized website 6 via administrator computer 3. There will be options for ongoing administration of the purchasing school and upgrades.

Option B: Satellite Site Administration

For satellite site administration, the initial set up of the systems depicted in FIG. 18 will include a complete music journal site. This process will be automated. The interested party will purchase the license to run the site. The purchase price will include the initial site install and any bug fixes for a specified time period. Feature enhancements to the system depicted in FIG. 18 will be made available to the satellite sites on a fee basis. Upon completing purchase details, the purchaser will be instructed to enter site centric details. Upon submitting these details the site will be automatically created and immediately available. The purchaser will receive instructions to administer and brand the site with their logo. The site will function as explained above in reference to FIGS. 1-18.

Administrative Options

The satellite sites will need to populate the site with users. At the time of purchase the purchaser will have the option to choose their administration options.
 Option A: Centralized Administration
 Centralized Website Administrator enters student population
 Option B: Satellite Site Administration
 Students register themselves
 Purchaser administrator populates site

Expanded Upload Functionality

The purchasing school may opt to install the module to have upload limitation based on file size on a per fee basis as described below in the Payment by Users for Additional Uploads section of this blueprint document. In this instance, the purchasing school must obtain an Internet Merchant Account to facilitate payments. The installment and activation of this module would be handled by the centralized administrators.

Considerations for Establishing a Merchant Account

An Internet Merchant Account is procured to take real-time processing of credit card payments and develop a shopping cart system to handle payments, and then modularize this section for resale.

Version control of the website software is established. Because the overall plan is to continually offer enhancements and additionally, as bugs are worked out of the system, various versions of the software will be a part of that process. Tight version control is preferably put in place. The initial purchase preferably includes all bug fix version releases—however feature enhancements may be charged separately as add-ons.

As stated above—server considerations for satellites is preferably addressed. Defining a relationship with a hosting company, or with Support and Development (SD) Support could provide additional income stream while providing a benefit to the purchaser.

All user manuals, administration manuals and licensing agreements will preferably be developed. The manuals can be taken from the centralized website user manuals and modified, the licensing agreements, what people are allowed and not allowed to do with the software, will need to be made from 'scratch'.

Marketing considerations are preferably taken into consideration. For example, the level of Internet marketing is preferably considered.

Support considerations: In a preferred embodiment, blogs, wikis, and forums are added to support the software. Support included with the purchase is negotiable. Also, preferably, efforts are taken so that customer expectations are high based on service offering to ensure a positive experience.

Payment by Users for Additional Uploads

Preferably there is a file size upload limitation (per month) for users of website 6. Also, preferably, users of web site can opt to pay additional fees for uploading beyond that limitation. Students, Family/Friend and Teachers would have the ability to pay for additional uploads for any student user group. So if for example, Grandma came to the site to upload her video of a recital, but upload limit for the account had been met—she could purchase additional space to upload her video if desired.

Preferred Upload Limitation Process

In a preferred embodiment, the system is set up so that each time a user from any student group uploads video/audio or photos, a folder is created at the server for the student group, based on Student ID. Inside that folder, each month a new folder is created to store that month's set of downloads. When the user group meets the monthly limit a message would display indicating upload limitations are met for the month with a link to purchase more space. Preferred options regarding how this space would be allocated is addressed below. In one preferred embodiment, the system only displays the user limit reached message with email address to contact the administrator at centralized website 6.

Further Upload Limitation Considerations

In one preferred embodiment it is possible to charge for blocks of space to 'pay as you go'. In this preferred embodiment, the user could purchase just enough space to upload the desired file. This option is attractive because it is user friendly. However it may be more difficult to set up because the administrator will have to programmatically say, this user group has purchased this amount of additional space. Allow it for this instance. But disallow the next time and show the upload limit message.

In another preferred embodiment membership levels with a monthly fee can be purchased for a desired amount of additional space. In this preferred embodiment membership plans could be set up that allow for X amount of additional space. This is easier to create because plans can be set up to place different student ID groups into different categories of membership one time per month, instead of on a continual per instance basis.

Second Preferred Embodiment

This second preferred embodiment is similar to the first preferred embodiment. It is described by reference to specific web pages (FIGS. 22-30) established by Applicants to permit these secure private Internet systems for monitoring progress of music students.

FIG. 22 shows home page 501 for the Music Journal site. This and the pages in the main navigation bars in the header and footer are the only pages available to the public. The Sidebar area offers a log in panel and a News & Events section that features three News & Events items (only one shown). Upon Login the user is directed to various pages depending on the user's role. There are five defined roles within the system. Student, Teacher, Family/Friends, an Administrator and a Super Administrator.

Student Login Landing Page

Figure 23:
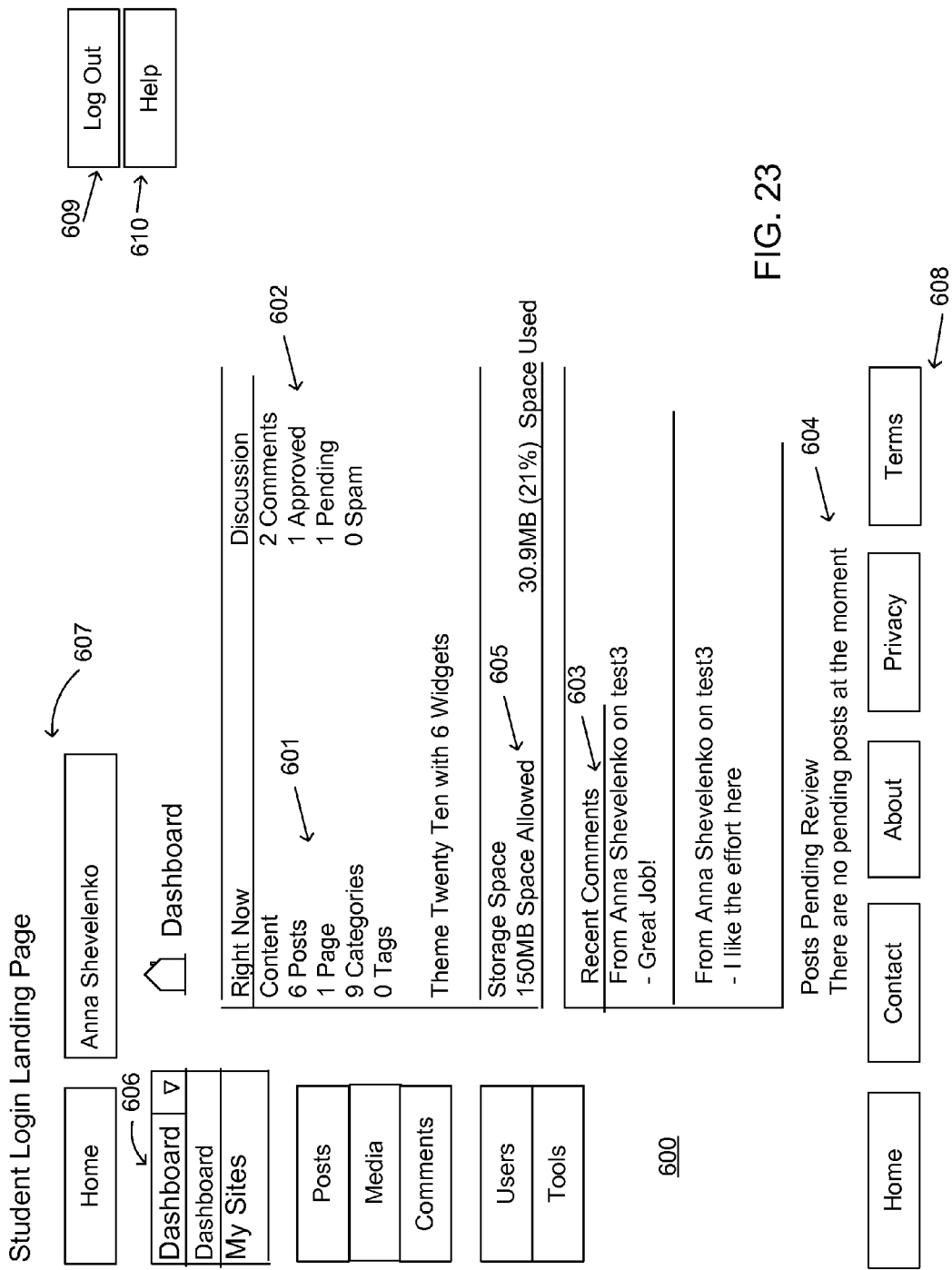

FIG. 23 is a screen shot of the student landing page after login with explanation for each role type. Upon login the Student is directed to their Journal's Administration Panel as shown in FIG. 23. The panel displays data pertinent to the Student's journal including:

Item 601: Total number of posts, pages, categories and tags on the Student's journal Item 602: Total number of comments and status Item 603: Recent Comments made on the Student's journal Item 604: Any posts a Teacher or Family/Friend role has made in need of review Item 605: Storage space allotted and utilized for the month 2

Item 606: Navigation to all back-end administration processes

Item 607: Navigation to front-end journal pages

Item 608: Main MMJ navigation items

Item 609: Log out from the MMJ system

Item 610: Contextual help—Clicking this gives instructions on the screen shown and changes based on the screen the Student is accessing.

The Student has ultimate control over content on their MMJ. They may make all the posts and/or comments they would like and determine whether to display them or archive them for future or immediate use. All comments and posts made by Family/Friends or Teachers must be approved by the Student before they will appear on the MMJ. All posts made by Family/Friends or Teachers must be reviewed by the Student. If the Student chooses they may place the item on their MMJ or they may choose to simply archive it in the system and not display it to the members of the MMJ. The Student may also add new Family/Friend members (up to 25). The processes to execute these functions are described in further sections of this document.

Family/Friend and Teacher Login Landing Page

Figure 24:
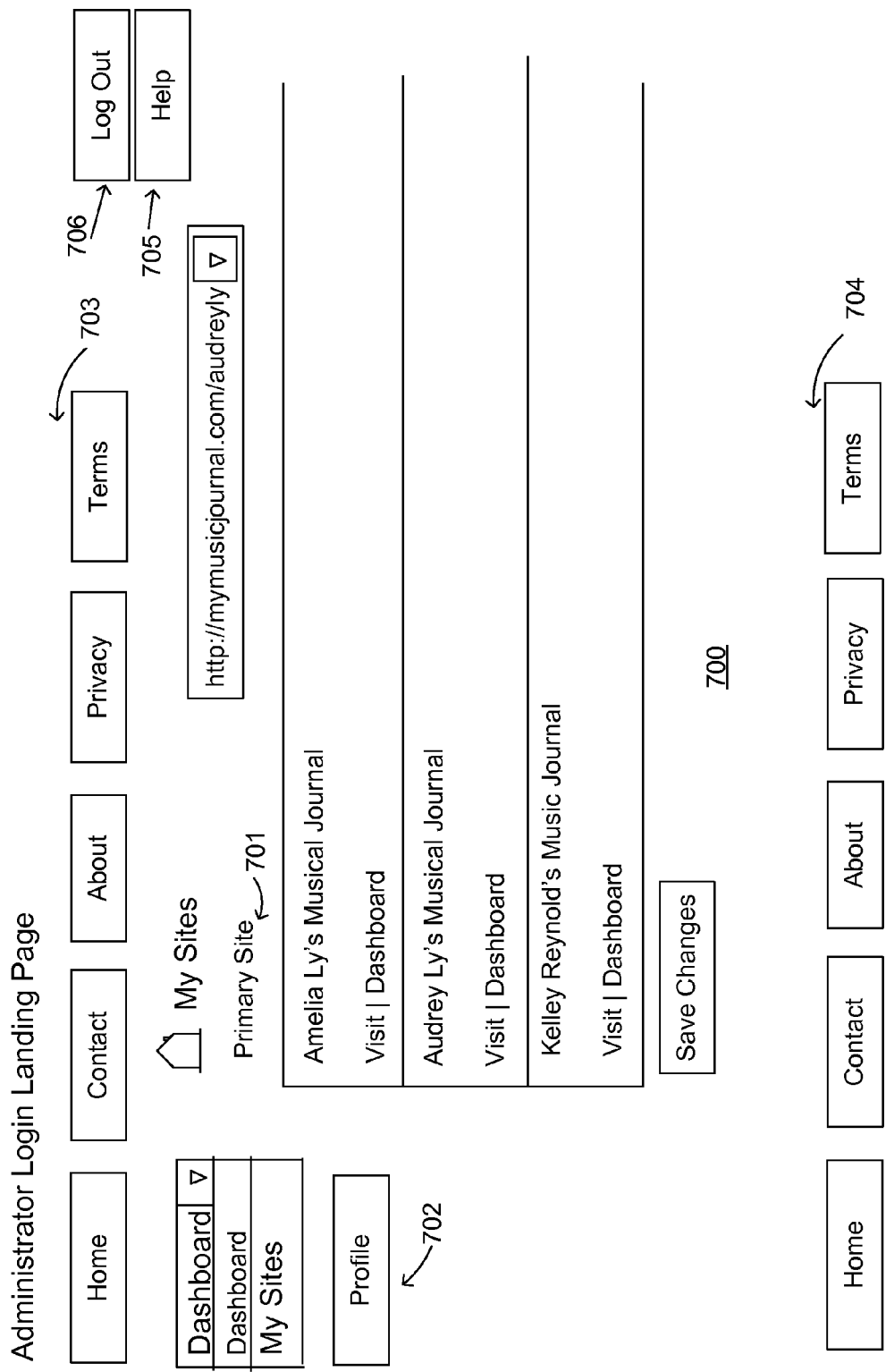
Figure 25:
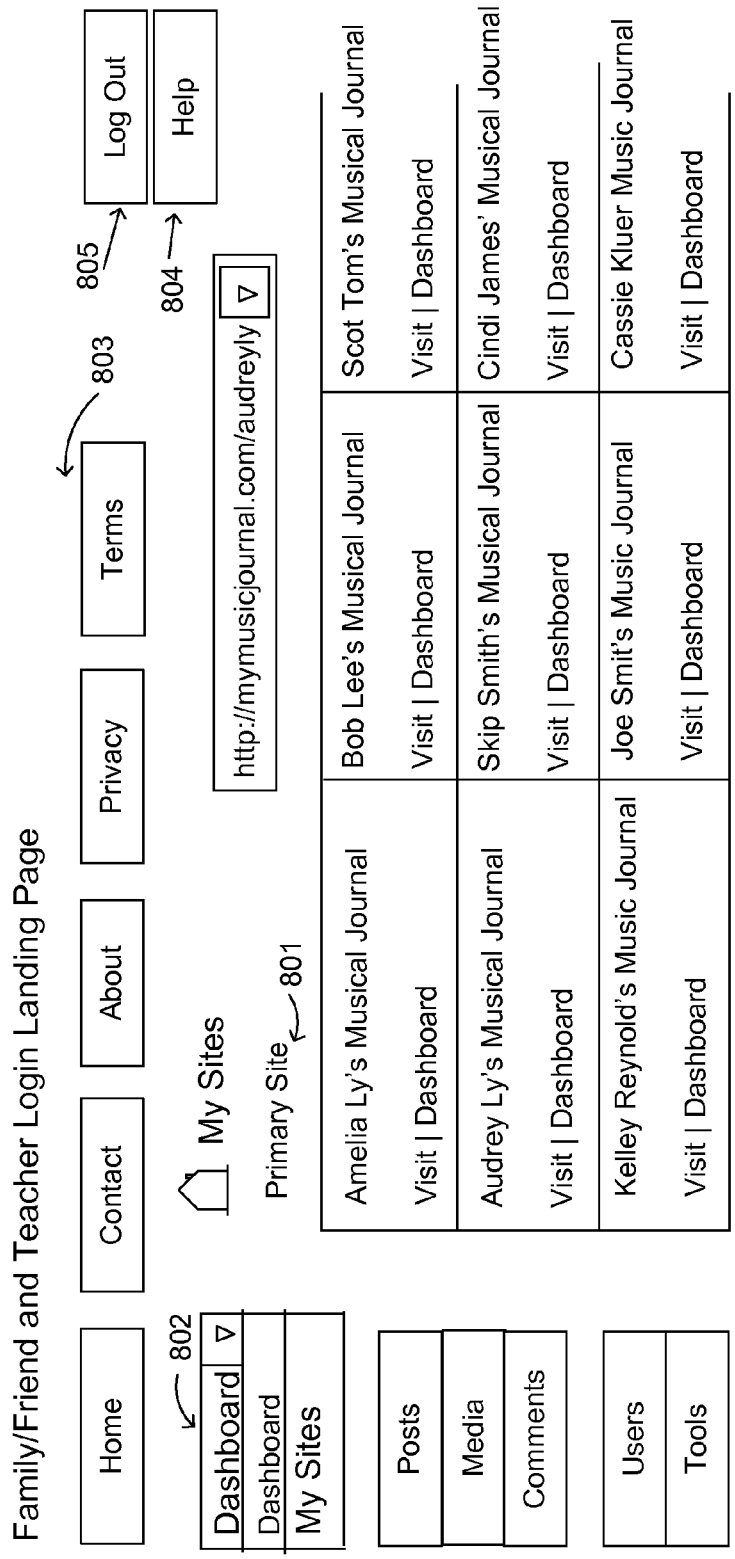

Upon login the Teacher or Family/Friend member is directed to a page 700, FIG. 24, that displays the MMJs the Teacher or Family/Friend is a member of. Note the following:

Item 701: List of each Student the Teacher or Family/Friend is associated with. Clicking on the link will take the them to the Student's front-end MMJ where they have the ability to choose to comment or post (process described later)
Item 702: Link to profile
Item 703: Main MMJ navigation
Item 704: Main MMJ navigation
Item 705: Contextual help—Clicking this gives instructions on the screen shown and changes based on the screen the Teacher is accessing.
Item 706: Log out from the MMJ system

Administrator Login Landing Page

Upon login the administrator is directed to page 800 (FIG. 25) that displays all the MMJs in the system. Clicking on any of the names will allow the admin to access the front-end of the MMJ chosen where the admin can then choose to access the administration panel for that MMJ, add or edit posts or comments. These processes are described in further sections of this document. The admin may also create, edit or delete and MMJ and add posts or pages to the main MMJ. Note the following:

Item 801: Lists all MMJs in the system
Item 802: Link to backend processes for the main MMJ site
Item 803: Main MMJ navigation
Item 804: Contextual help—Clicking this gives instructions on the screen shown and changes based on the screen the admin is accessing.
Item 805: Log out from the MMJ system

Super Admin Login Landing Page

Figure 26:
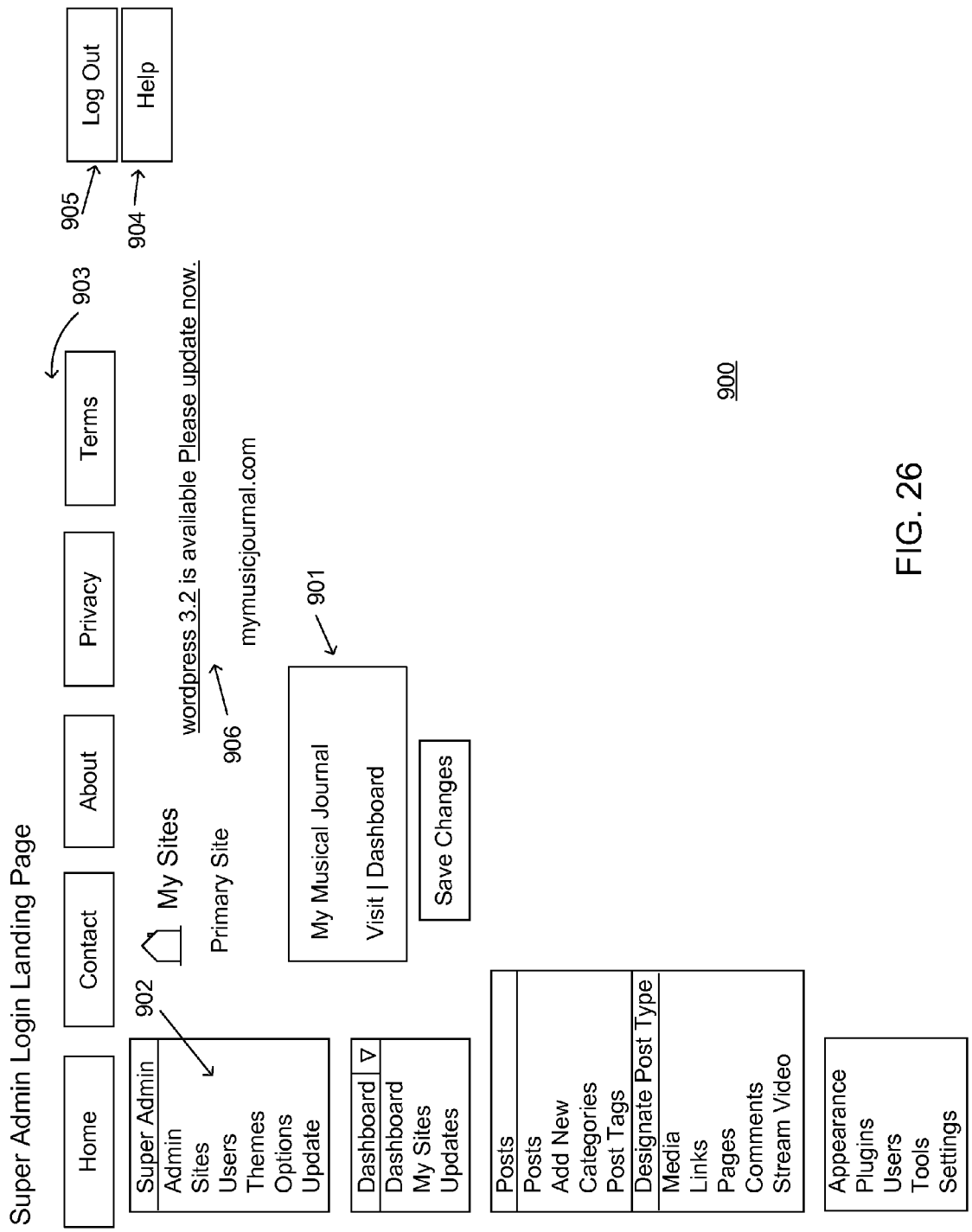

A Super Admin has full control of the system via super admin login landing page 900, FIG. 26. This role can add/edit/delete and MMJ on the system and change the structure of the system through appearance, plugins, tools, etc. The super admin may also add pages and posts to the main MMJ page. Note the following:

Item 901: Shows the MMJ main site
Item 902: Link to backend processes for the main MMJ site
Item 903: Main MMJ navigation
Item 904: Contextual help—Clicking this gives instructions on the screen shown and changes based on the screen the admin is accessing.
Item 905: Log out from the MMJ system
Item 906: Informs the Super Admin of the latest version of Wordpress availability.

Student Processes

This section of the document describes the Student processes on the MMJ. Below is a list of each Student process:
Post Activities
Add/Edit/Delete Posts for use on MMJ main page or Teacher pages or to Archive
Review and approve/decline posts
Comment Activities
Review and approve/decline comments
Other Activities
Add users
Edit Profile

Post Activities

View All Posts on the MMJ

The Student may access screen 1000, FIG. 27 by clicking posts in the left navigation bar, clicking posts from the 'Right Now' section of the login landing page or by clicking edit posts from the front end main MMJ or individual post pages. Note the following:

Item 1001: List of all posts—This shows all published posts and indicated whether the post is pending. If the Student clicks on the post, the arrive at the edit post screen. If the post is pending they may approve it for display or archive in their MMJ or they may decline or delete it. Upon hover of the post title, the Student may quick edit various elements of the post, edit the full post in the edit post screen, delete, or preview the post in the front end of the system.
Item 1002: Note the pending status of the first post in the list. Anytime a Teacher or Family/Friend member makes a post, they submit it for Student review. The Student can view pending posts from this screen or by clicking the pending posts section from the Student login landing page. If the Student clicks on the pending post, the full post edit screen becomes available. The Student can then review the post and determine whether to delete, approve and possibly make the post available on the public side of their MMJ. The top, bottom and left side navigation items remain the same as well as the log out and the contextual help.

Post Activities

Edit/Add/Approve Posts

Make Available on Teacher or Main Journal Page

The Screen shown in FIG. 28 allows the Student to view or create the post content and determine placement or archive status on their MMJ. This is the same screen that is used when the Student makes a new post. This screen is accessed by clicking a post in the previous screen or when the Student clicks Add New Post from the left navigation bar in the Student Admin bar or from the front end My Journal sidebar. The screen depicted below displays a pending post, however the processes remain the same regardless of whether the post is originated by the Student or a pending post from a Family/Friend or Teacher role post type. Note the following:

Item 1101: Display Post: If the Student clicks the box MyJournal, the post will be public on the main MMJ page. Users then may click on the post to view complete content and comment. If the Student does not click the MyJournal box, the post is archived by category and post type. At any time the Student may choose to bring the post out of archive status and display it on their main MMJ page by checking the MyJournal box. In future iterations of the MMJ, the Student may also choose to place the post in a publicly pay per view available area here as well. This will allow any user of the MMJ view the post for a fee without being a member of the Student's MMJ.

Item 1102: Category Listing—if the Student selects the Teacher's name from the category box—the post will be available on the Teacher's page. This page is only available to the Student and the Teacher. The Student can select any number of categories they would like to categorize the post. When the Family/Friend member or Teacher makes a post, they may suggest a designation for category, but the Student may choose to change this designation. Selection of categories at this point does not affect where the post appears. Additionally, the Student may choose Profile to place a profile about themselves in the sidebar and Profile Pic to include a picture.

Item 1103: Designate Post Type: here the Student designates the post as an audio, video, photo or other. Again, the post maker may make suggestions but the Student has final control over post type. Again designation of post type does not affect placement of the post.

Item 1104: In the instance the Student is making a new post or editing a current post, the Student may upload audio, video or photos to include in the post. Any items added go against the allocated space for the month and will appear in the "right now" section on the Student login landing page. Next to these buttons are contextual help that allow the Student to gain more information about how and what file type to upload to their journal. MMJ does provide video clips from Student recitals for Student to place on their MMJ. In this case, when the Student chooses to add video, they may search for any videos uploaded to their MMJ video clips file to add to any post of their choice.

Item 1105: This box shows all the comments approved or pending related with the post being viewed. The Student may click on the post to delete, edit or approve a pending post.

Item 1106: Once the Student has added all content, or edited the content from a pending post, they will click the blue button at the top right which is either—publish in the case of a pending or new post, or update if the Student is editing the post. The top, bottom and left side navigation items remain the same as well as the log out and contextual help.

Comment Activities

Review and Approve/Decline Comments

Comments are enabled by default. This means anytime a post is added to the MMJ members of that MMJ may make posts or comments. The Student may turn off the ability to comment in the edit posts screen by clicking quick edit and deselecting the allow comments box. The Student may manage comments in several ways:
  Clicking Comments in the left side navigation bar
  Utilizing the Comments box on the Student login landing page
  Editing the post in which a comment is awaiting moderation The process to moderate comments is the same regardless of the method used. FIG. 29 shows screen 1200. Note the following:
  Item 1201: Upon cover the options to moderate are as follows:
    Approve/Unapprove—Upon approval the comment becomes available to members of the MMJ
    Reply: This allows the Student to reply directly to the comment made
    Quick Edit: This allows the Student to alter the contents of the comment
    Edit: This allows the Student full options to alter the comment
    Spam: This designates the comment as spam, the system recognizes this and disallows users from that IP or address from posting again.
    Trash: This allows the Student to place the comment into the trash where it will need to be deleted permanently.

All other items on the page remain the same; top, bottom and left navigation as well as logout and contextual help.

Other Activities

Add users/Edit Profile

Students may add Family/Friend members up to 25. The process is as follows:
1. Student clicks users on the left navigation bar in the administration side of the MMJ
2. Student clicks add new user
3. Student enters a user name, email and chooses the Family Friend role from the drop down box
4. A confirmation email is sent to the email address entered
5. When the new user clicks the activation link, the account is activated and the page displays the username and a randomly generated password.
6. The new user is provided a link to login and directed to change the password to something easier to remember.

From the users page the Student may also remove Family/Friend members.

Other Activities

Edit Profile

The Student may access their profile page by clicking on users in the left navigation bar and then selecting Your Profile. On the resulting screen the Student may change the email address, password, or how their name is displayed in the MMJ. usernames once assigned cannot be changed.

Teacher and Family/Friend Processes

While Teacher and Family/Friend roles are different in scope, their role assignments and privileges are the same. Both roles can submit a post for review, upload audio, video or photos to the posts, submit comments for review and edit their profiles. The only difference is the Teacher role has access to the Teacher page, and the Family/Friend role does not.

Front End Processes

FIG. 30 shows screen 1300, which is the main MMJ student page. The main MMJ page for each student houses content the student has approved or posted. There is also a page for each teacher the student is associated with. This page houses content the student has approved and is only viewable between the student and the teacher. The sidebar navigational system changes based on user role.

Main MMJ Logged in as Student

Any role may access this page after logging in and clicking the Home button in the backend of the MMJ in the top main navigation. Note the following:

Item 1301: All post content approved by student to appear. Each post is excerpted here. The user may click on the title of the post to view full post content. If there are comments, the number of comments is posted at the bottom—and there is also an edit link that allows the student to directly edit the post.

Item 1302: This side bar navigation allows the student immediate access to the backend of the MMJ to perform the tasks listed.

Item 1303: This house content and a picture created by the student and categorized as Student Profile and Student Profile Picture.

Main MMJ Logged in as Teacher

FIG. 31 shows the main MMJ teacher page 1400. Note that this screen is the same as the Student front end MMJ (FIG. 30)—the only difference is item 1401—The Teacher only has the ability to Log Out or Edit a Post.

Main MMJ Logged in as Family/Friend

FIG. 32 shows the main MMJ family/friend page 1500. Note that this screen is similar to screens 1300 and 1400 except for the sidebar navigation (item 1501) and also the main top navigation does not have the teacher page available.

Third Preferred Embodiment

Public Performances of Copyrighted Works

Public performances of copyrighted works may be an infringement of the copyright unless the public performance is pursuant to a license from the owner of the copyright. In a third preferred embodiment of the present invention (which can be an addition to either the first or second preferred embodiments described above), a music studio and its music teachers utilize the Internet to permit their students to perform copyrighted works for the general public. In accordance with this embodiment the music studio may enter into agreements with owners of copyrighted works or their agents authorizing the music studio to make available to the general public performances by students of the copyrighted works. The studio would then provide its teachers with lists of copyrighted works covered by the agreements. Performances of the copyrighted works may be uploaded to the server described above (or a separate server) and made available to the public. The server would be programmed with software to permit members of the general public to pay a fee to the studio to download, listen to or view the performances of the students. A portion of fee may be automatically set aside to pay an agreed upon license royalty to the owner of the copyright or his agent. Another portion of the fee is set aside for the student performer and/or his teacher. The music studio may charge the teacher or the student an up-front fee with respect to each performance uploaded to be made available to the general public.

In an alternative embodiment the music studio may rely on its teachers or their students to negotiate licenses with copyright owners or their agents that permit Internet performances of the copyrighted works. If the administrator is aware that copyrighted works are uploaded for access by the general public, he may require evidence to support the students or teachers assurance that a licenses from the copyright owner or his agent has been obtained.

Works that are in the public domain are not covered by copyright and may be made available to the general public, in which case any fees collected may be divided between the studio and the student and/or his teacher.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A music performance monitoring system providing for the utilization by a music studio of the Internet to permit private monitoring by a studio administrator, a plurality of music teachers and a limited number of selected third parties of music performances of copyrighted works by a plurality of music students without violation of copyright laws, said system comprising:
   A) a music studio controlled server computer in communication, via the Internet, with the plurality of music students, the music teachers, if any, of each of the plurality of music students, the administrator and the limited number of selected third parties, said server computer comprising:
      i. software adapted to permit Internet communication among the plurality of music students, their music teachers and a limited number of selected third persons,
      ii. software adapted to permit input through the Internet regarding the student's music performances from said limited number of selected third persons,
   B) a plurality of student computers in Internet communication with said server computer, said plurality of student computers; each of said student computers comprising software adapted to permit:
      i) each of the plurality of students to upload to the server computer, encrypted student performances of musical works for storage in a file associated with the student,
      ii) each of the plurality of music students to verify registration of a limited number of computers in communication with the Internet that are to have access to the student's file and are under control of selected third parties who have agreed prevent access to members of the general public of the students performances;
   C) a plurality of third party computers in Internet communication with said server computer, wherein each of said plurality of third party computers comprises:
      i. software adapted to permit monitoring by the limited number of selected third parties, via the third party computers and the Internet, of student performances of musical works,
      ii. software to permit transmittal to the student via the third party computers, the Internet and the server computer of responsive information based on said student performances of the musical works,
   wherein the music performances of copyrighted works thereby made available to the administrator, music teachers and the selected third parties can be controlled in a manner that the performances qualify as private (not public) performances under relevant copyright laws and not an infringement of copyright.

2. The system as in claim 1 and further comprising a music teacher computer in Internet communication with said server and programmed with software adapted to permit transmitting and receiving music information related to the learning process of the music student.

3. The system as in claim 1, wherein said server computer is programmed with software adapted to produce a web site to facilitate said communication between each of said music students and the limited number of selected third parties.

4. The system as in claim 3 where the limited number of selected third parties selected by each of the plurality of students are all friends or family members of the selecting students.

5. The system as in claim 1, wherein uploaded performances of musical works comprises:
   D) audio files,
   E) video files, and
   F) picture files.

6. The system as in claim 1, wherein uploaded performances of musical works comprises:
   G) jam sessions,
   H) lessons,
   I) accomplishments,
   J) practice sessions, and
   K) recitals 7. The system as in claim 1 wherein the server is also programmed to permit access by the general public to performances of licensed copyrighted and non-copyrighted works by the students for a fee.

8. The system as in claim 7 wherein the fee is shared between at least the owner, if any, of the copyright, the music studio and the student.

9. The system as in claim 7 wherein the fee is shared between at least the owner, if any, of the copyright, the music studio, the student and the teacher.

* * * * *